(12) United States Patent
Latif et al.

(10) Patent No.: US 9,407,698 B1
(45) Date of Patent: Aug. 2, 2016

(54) SHARING AND SYNCHRONIZATION OF DATA OBJECTS BETWEEN AUTONOMOUSLY COOPERATING PEER DEVICES

(71) Applicant: EarthNetTV Inc, Lansdale, PA (US)

(72) Inventors: Farrukh Amjad Latif, Lansdale, PA (US); Richard Nesin, Sinking Springs, PA (US)

(73) Assignee: EarthNetTV Inc., Lansdale, PA (US)

( * ) Notice: Subject to any disclaimer, the term of this patent is extended or adjusted under 35 U.S.C. 154(b) by 0 days.

(21) Appl. No.: 14/800,662

(22) Filed: Jul. 15, 2015

Related U.S. Application Data

(63) Continuation of application No. 13/771,931, filed on Feb. 20, 2013, now Pat. No. 9,098,586.

(60) Provisional application No. 61/668,054, filed on Jul. 5, 2012.

(51) Int. Cl.
*G06F 17/30* (2006.01)
*H04L 29/08* (2006.01)
*H04L 29/06* (2006.01)

(52) U.S. Cl.
CPC .......... *H04L 67/1095* (2013.01); *H04L 65/403* (2013.01); *H04L 67/1042* (2013.01); *H04L 67/141* (2013.01)

(58) Field of Classification Search
USPC .......... 707/604, 640, 687, 693, 736, 765, 802
See application file for complete search history.

(56) References Cited

U.S. PATENT DOCUMENTS

| | | | |
|---|---|---|---|
| 5,289,580 A | 2/1994 | Latif et al. | |
| 7,747,639 B2 * | 6/2010 | Kasperski | G06F 17/30864 707/765 |
| 8,095,582 B2 | 1/2012 | Cramer | |
| 8,245,183 B2 | 8/2012 | Iborra et al. | |
| 8,607,238 B2 | 12/2013 | Nagpal et al. | |
| 2007/0128899 A1 * | 6/2007 | Mayer | G06F 9/4406 439/152 |
| 2007/0183740 A1 | 8/2007 | Ando et al. | |
| 2008/0177994 A1 * | 7/2008 | Mayer | G06F 9/4418 713/2 |
| 2009/0125546 A1 | 5/2009 | Iborra et al. | |
| 2014/0314215 A1 * | 10/2014 | Duva | G06Q 30/0202 379/88.01 |

OTHER PUBLICATIONS

Fang Weijian, "Distributed Object Sharing for Cluster-based Java Virtual Machine", the degree of Doctor of Philosophy at the University of Hong Kong, 2004.
Blair MacLntyre, "Shared Objects for Distributed, Interactive Graphics", Summer Talks '96, http://www.cs.columbia.edu/~bm/phdtalk96/sld001.htm

* cited by examiner

*Primary Examiner* — Sana Al Hashemi
(74) *Attorney, Agent, or Firm* — IP Legal Services, LLC

(57) ABSTRACT

A device for sharing and synchronizing data objects with peer devices. The device has a memory, interface for communication with a peer, and a processor. The memory is configured to store therein least one data object that is deemed either an original or a copy. When in communication with a peer device, the processor transmits a request for the peer device to send an original data object that corresponds to a data object stored in the memory if the stored data object is a copy and it is to be modified. The processor then stores the requested data object in the memory as an original data object or, if the requested data object is not received, marks the data object stored in the memory as an original. Then the processor may modify data in the original data object stored in the memory.

42 Claims, 17 Drawing Sheets

SHARING AND SYNCHRONIZATION OF DATA OBJECTS BETWEEN AUTONOMOUSLY COOPERATING PEER DEVICES

CROSS-REFERENCE TO RELATED APPLICATIONS

This application is a continuation application of allowed U.S. patent application Ser. No. 13/771,931 filed 20 Feb. 2013, which claims the benefit of the filing date of U.S. provisional application No. 61/668,054 filed 5 Jul. 2012, and related to U.S. Pat. No. 8,918,411 filed 7 Aug. 2013, all of which are incorporated herein by reference in their entirety.

FIELD OF THE INVENTION

The invention pertains to the field of information processing where data is collected or harvested from a variety of sources, including TV, web, movies, videos, mobile phones, and photos owned by the user, processed by the invention, and a new class of output is produced that addresses privacy problems and provides new services to the user and the data providers.

BACKGROUND OF THE INVENTION

The convergence of TVs and boxes connected to the Internet has produced unexpected changes in consumer behavior. Many users consider Internet access to be a means to provide them with even greater choices for content—such as allowing them to switch to Over-The-Top (OTT) content rather than watch traditional TV programming. Additionally, Internet access provides them with the ability to research, investigate, and find bargains for products and services that interest them. Users spend even more time "channel surfing", jumping from content to content, or looking for inexpensive products or services matching their needs and budgets. By not "locking-in" to a specific channel or content stream for an extended time or hopping from one merchant to another, they are in fact not behaving the way service providers and advertisers expect them to—which minimizes the effectiveness of traditional advertising campaigns.

Advertisers want to maximize the use of the Internet portal available to them. They push intrusive advertisements over the portal often based on cookies and information that they have collected from users activities on their websites that are in effect "recommendations" for the user to pursue an action. The user is forced to watch these advertisements if they want to see the desired content. These advertisements show up as banners, pop-ups, or pointer position-based advertisements that are difficult to bypass on the TV. These advertisements are in addition to the campaign based advertisement the user is already forced to watch if they view the live TV content through the TV network portal.

Content providers use the same Internet portals to invade user privacy by recording user actions on their servers. They use this information to bombard the user with advertisements and explicit content or merchandise "recommendations" hoping for a sale. They also sell or share user information to varying degrees as well as their "recommendations" for commercial benefit.

Although the recommendation provided by content providers may provide some benefit to the user, the recommendations are handicapped by fundamental limits on the "quality" of the data they use to provide the recommendations. The content providers use all the means currently available to them to record user actions. For business and legal reasons, this data is typically not shared with other content providers so there is no opportunity to compare and refine the accuracy of the data based on a broader sampling. In order to increase accuracy, each provider "tweaks" or customizes their methods—which often runs up against the problem of invasion of privacy. There are many methods used by content providers to determine "user preferences" from a distance. Regardless, the information deduced by a content provider at a distance will generally be inferior when compared to the information that can be collected locally where the user operates; which is to say at the point of origin of the user data.

Existing techniques for analyzing user preferences can be split into two broad categories characterized by vendor or provider. The first category includes vendors such as Amazon, eBay, and Netflix that offer commerce or content as a service or for sale. Such vendors develop and maintain "user profiles" based on: (1) what the users search for in merchandise or content, (2) "visits" information such as reviews or product information, and (3) the activity recorded in their accounts. Using these profiles, vendors can make "suitable recommendations" in the hope of increasing sales.

The second category includes vendors such as Microsoft, Google, Facebook, and Apple whose primary business is to dispense information or provide services related to the information. Such vendors' offerings include search engines, information databases, and application marketplaces that users routinely access. These vendors desire to determine and maintain track of user behavior so they can provide the most relevant and current information on a search query, fastest access to the database, and the newest applications in their application marketplace for sale.

All of these vendors employ techniques whose scope is limited to what the user does on or through their websites. They use sophisticated algorithms that rely on information such as, how a user initiates the search subject and the key words used, navigation over the results offered, position of the mouse pointer, how much time the pointer spends on a particular position, the number of clicks on links formed within a chain of users (member's friend list) and so on.

User devices currently available in the market (e.g., Set-Top-Boxes (STBs), PCs, laptops, smart phones, tablets, and so-called "Smart TVs"), whether purchased through retail or supplied by service providers, are typically configured by the manufacturer or retailer to go to the manufacturers or service provider's server on the Internet, the Internet Protocol (IP) based private network, or 4G—Long-Term Evolution (LTE) wireless network. When Internet is selected on a "Smart TV" purchased from a retailer, for example, the User Interface (UI) displayed will be the one supplied by the manufacturer. Similarly, when an IP STB provided by a TV service provider is turned on it will display the service provider's UI. In both cases the UI is driven by a server owned by another party whose interests might be different from that of the user. While the other party may be focused on driving the user to download music or movies from their "preferred" content supplier, that supplier may not be the best fit to the user. This only offers limited choices to a user and does nothing to resolve the problem of user privacy or reduce the manual processing of information required to locate the best alternatives available across the Internet that match the detailed and accurate personal preferences of the user.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a method and apparatus for sharing and synchronizing data objects between peer devices while in communication with each other. Each device has a memory, a first state, and a second state. When the device is in the first state, it is configured to establish communication with a peer device via an interface and enter the second state once communication has been established with the peer device. Once in the second state, the device transmits to the peer device a request for the peer device to send an original data object that corresponds to a data object stored in the memory if the data object stored in the memory is a copy and data in the stored data object is to be modified by the apparatus. The device then receives the requested data object or a negative response from the peer device, stores the requested data object stored in the memory as an original data object if the requested data object was received, marks the data object stored in the memory as an original data object if the requested data object is not received, and modifies data in the original data object stored in the memory.

BRIEF DESCRIPTION OF THE DRAWING FIGURES

Other aspects, features, and advantages of described embodiments will become more fully apparent from the following detailed description, the appended claims, and the accompanying drawings in which like reference numerals identify similar or identical elements.

DETAILED DESCRIPTION

Figure 1:
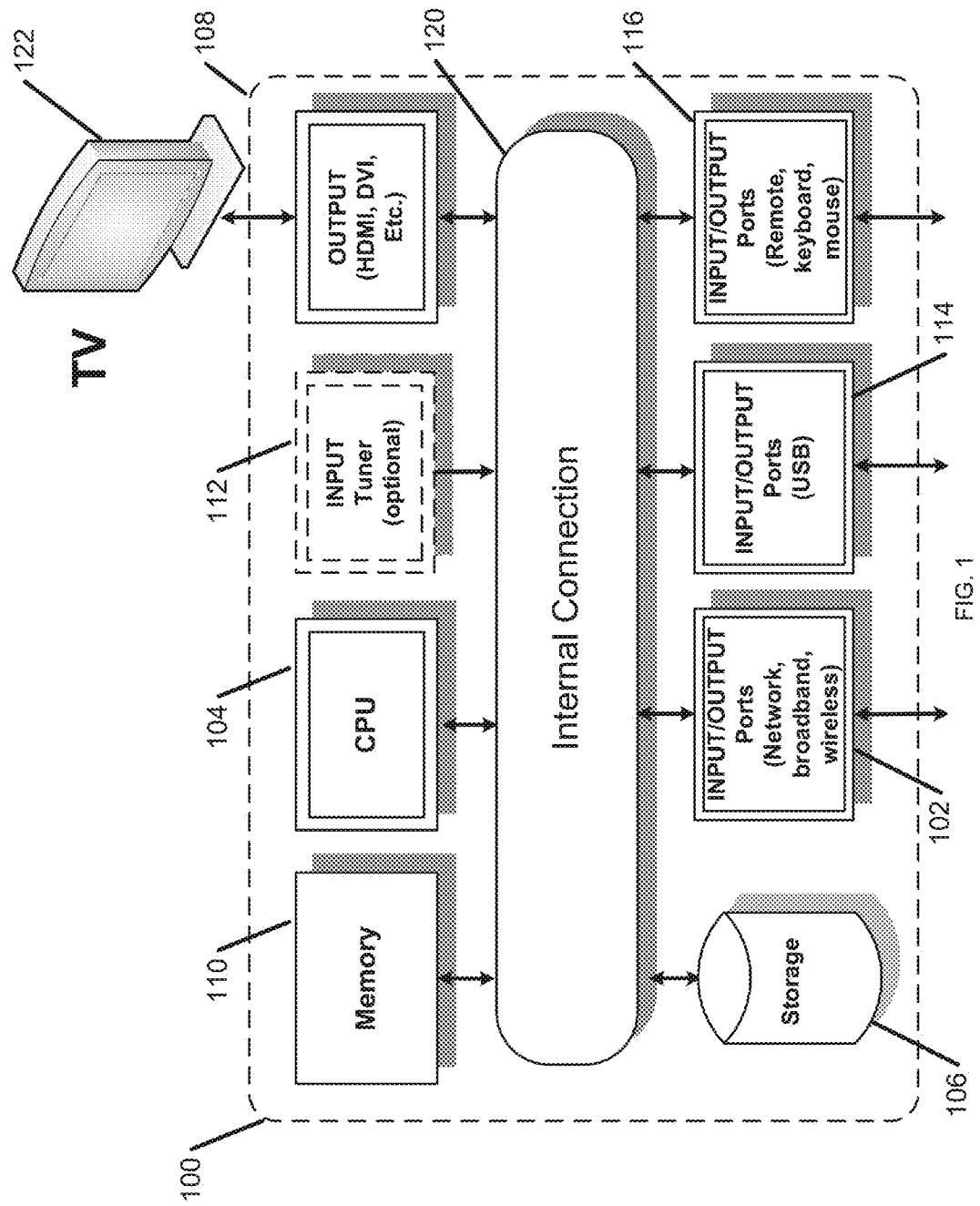
FIG. 1 shows a block diagram of a system operating in accordance with exemplary embodiments of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation".

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

Also for purposes of this description, the terms "couple", "coupling", "coupled", "connect", "connecting", or "connected" refer to any manner known in the art or later developed in which energy is allowed to be transferred between two or more elements, and the interposition of one or more additional elements is contemplated, although not required. Conversely, the terms "directly coupled", "directly connected", etc., imply the absence of such additional elements. Signals and corresponding nodes or ports might be referred to by the same name and are interchangeable for purposes here. The term "or" should be interpreted as inclusive unless stated otherwise.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Table 1 defines a list of acronyms employed throughout this specification as an aid to understanding the described embodiments:

TABLE 1

| USB | Universal Serial Bus | FIFO | First-In, First-Out |
|---|---|---|---|
| STB | Set-Top-Box | I/O | Input/Output |
| OTT | Over-The-Top | PC | Personal Computer |
| IP | Internet Protocol | UI | User Interface |
| CPU | Central Processing Unit | USB | Universal Serial Bus |
| IPTV | Internet Protocol Television | SEO | Search Engine Optimization |
| 3G/4G | Third/fourth generation mobile communications technology | TCP/IP | Transmission Control Protocol/Internet Protocol |
| DLNA | Digital Living Network Alliance | HD | High Definition |
| ATSC | Advanced Television Systems Committee | FM | Frequency Modulation |
| DVB-XX | Digital Video Broadcast, where XX = T, T2, . . . for Terrestrial Services | MW | Medium Wave |

TABLE 1-continued

| SW | Shortwave | LW | Long Wave |
|---|---|---|---|
| AR | Attribute Repository | PR | Presentation Repository |
| uPnP | Universal Plug-and-Play | EPG | Electronic Programming Guide |
| COn | Child Object, level n | URL | Uniform Resource Locator |
| WiFi | Wireless Fidelity | TCP/UDP | Transmission Control Protocol/User Datagram Protocol |

The described embodiments addresses several problems with prior approaches to user searches of the Internet, including: (1) the difficulty for users to obtain content, information, and deals that match their interests, (2) the need for users to sift through large amounts of mostly irrelevant search results provided by Internet search companies, (3) preventing Internet service companies from invading user's privacy, (4) the limited ability of websites to provide user interest relevant recommendations, and (5) the virtually non-existent ability of a website to obtain recommendations from other websites a user visits. It is also desirable to curtail user annoyance and disaffection caused by intrusive advertisements that are generally irrelevant to the user.

The described embodiments focus on collecting the broadest and accurate information about the user and keeping it in a secure environment where it can be used to develop the right processing framework for the services that the invention provides. The point of origin of the user data includes his/her home, places of travel, and workplace. Devices operating in this "user domain", which includes set-top-boxes, PCs, laptops, smart phones, tablets, and Smart TVs, need to be smart and powerful enough to process information and generate the desired output while maintaining privacy and preventing external intrusions.

The invention might be embodied in software that can be implemented on any device or combination of devices operating in the user's domain that has the ability to compute and store information. It addresses the problems listed above and might provide the following benefits to the user, content providers, and advertisers:

For a system or device to act as an agent for a user, it is desirable for the system to anticipate and learn a user's needs and likes and, based on this, to identify the decision-supporting pieces of information out of the huge amount of data an Internet search or web surfing provides (site recommendations, numerous reviews/blogs, advertisements etc.). The decision-supporting pieces of information relative to what the user is watching or investigating at that time are generally relevant and are presented to the user. This type of intelligent capability reduces the time and effort for technical and non-technical users alike by using adaptive algorithms that continuously refine the received data.

Guided by this pertinent decision-support information, a user is much more likely to take action benefiting the content provider, a commercial establishment or an advertiser by making a purchase, watching content, or "asking" to view an advertisement.

The software runs on a box inside the user's home and on a platform(s) in the user's possession, such as a smart phone, with the user having full control over its actions and contents thereby maintaining privacy.

The machine-learned information is compartmentalized by the invention within the user's device in "buckets", also referred to herein as an Attributes Repository, that support the device specific (TV, mobile) watching experience. The relevant data in these buckets is used to present user interest centric information to be matched with product or services at the appropriate time. The appropriate time is determined by what the user is watching or investigating or, in case of advertisements, suitably scheduled at times that is least intrusive to the user and when the advertisement can be most effective. This reduces the ability of service providers, content providers, and advertisers to force irrelevant or badly-timed interruptions on the user. The user's overall watching experience is improved while reducing the incentive for the user to abandon a channel and its content.

Data in the buckets, suitably filtered, is sent to the service providers, content providers, and advertisers to enable them to offer suitable merchandise, content, or advertisements to the user. Individual custom Attribute Filters in the device, which can be configured differently for each service provider, content provider, or advertiser, are provided enabling the data sent to that destination to be suitably filtered preserving user privacy.

A suitable User Interface (UI) is provided that enables selection of categories, such as Broadcast TV, Movies or Shopping, and content such as a specific TV network in the Broadcast TV category, using a simple point and click remote control or other input means. This approach to navigation enables non-technical users to benefit from the advanced intelligence provided by a system incorporating the invention that supports the UI. The system learns from the content or by search performed by the user. Since the invention's processes are adaptive, the system will take a little more time to learn from a less sophisticated user, who may input vague Internet search terms, when compared to the more sophisticated user, who will input more refined search terms. Nevertheless, given enough time, the device will gain enough knowledge to converge and act as an agent for either type of user.

Although the disclosed embodiments are initially targeted at TV watching, it can be deployed on any equipment that has the ability to compute and store information and is used in other businesses. The categories in the invention can be extended to cover a broader knowledgebase for the general consumer or decreased to support a narrower and deeper knowledgebase when deployed by, for example, a business. For business applications, the system learns within the scope of the business categories and executes searches and display search results limited to these categories. The system would continuously learn by combining information from multiple websites and user inputs, thereby combining the search criteria and filter the results, specific to the business, in a way unavailable with today's generalized search products. Additionally, Attribute Filters would return the relevant customer metrics based on actual user behavior for a business application The disclosed embodiments support collaboration with cloud, mobile, or other devices when owned by the same user or where the user has access through an account or other means. In this implementation, a lightweight "client" component of the Application and data objects are installed on the mobile or other devices to provide all benefits of the invention to the user when, for example, a mobile device is traveling. The client version of the data objects is tailored for the device usage. When that device is in the vicinity of the device running the primary application (typically a STB box and also referred to herein as a hub device), it connects with the hub device over a communication link or other user network. As will be described in more detail below, the mobile device then synchronizes with the hub device and exchanges data to update the user's interest information in the hub device, such as location-based preferences and services. After synchronization, the hub and the mobile devices are up to date on user preferences and continue to learn with usage.

The disclosed embodiments might also allow the user to synchronize all content and subscriptions owned by the user across all devices owned or controlled by the user. Such collaboration eliminates the need to have copies of contents on all devices saving storage space or obtaining duplicate subscriptions to watch content while traveling. Content on any device can be accessed by any other device and a subscription through one device can be accessed by all other devices. Attribute Filters are used to set up a trusted link between two devices for content transfer. For example, if a user is in a foreign country, he or she can access videos, music, photos, and data files on his hub device or his home PC that are not on the mobile device. Similarly, a local television channel or an OTT movie could be accessed by the mobile device through the hub device that has subscriptions to both.

In the embodiments described herein, user characteristics are created and stored in the device based on his or her direct input and activities with the preferences based on actions the user has taken or is taking on the responses. This might produce more accurate results than existing techniques that determine the characteristics of the user from a distance.

The prior techniques determine the characteristics of the user based on user access of one vendor's website making all results and recommendations skewed towards this particular vendor. The embodiments herein might access data from multiple websites and filters search results to create a profile that best serves the user.

In order to increase advertisement "accuracy", vendors are continuously trying to access more information about the user. This has resulted in vendors encroaching on user privacy, sometimes disregarding user privacy settings. Another disturbing trend is vendors selling user's secure information to other vendors. The embodiments run as a custom application (separate from the standard browsers and operating systems that can be "hacked") on the device with the user controlling the privacy and security. Search requests are transmitted to multiple websites and the results extracted. Information verified by the user and enabled through Attribute Filters is transmitted to vendors and service providers. The user receives the information without compromising their privacy.

Currently, content and merchandise providers have the upper hand in business negotiations since they collect user information and can influence the merchandise and the contents "recommended' to the user. Infrastructure entities such as telephone and cable service providers are relegated to operate as "dumb pipes", i.e., simply acting as conduits for content and advertisements. By providing control of what users watch and buy, the embodiments herein might enable them to seek and obtain content or merchandise from any provider or a merchant. This reduces the control that a particular vendor currently enjoys over the user and the service provider.

Generally, service providers negotiate carriage rights for content with the studios, content creators, and distributors. The price service providers pay provides them with the leverage that they use to price the subscriptions that users pay as well as the advertising rates that the advertisers pay to broadcast advertisements on the service provider's network. This creates an environment in which the service provider sets the price of the subscriptions, bombards the user with advertisements based on what the advertisers are willing to pay (hereafter called "ad campaign") and, on a very limited scale, promote the merchant with whom they have business deals. Instead, a framework is created where users are favored for the best deals in content and merchandise and hence are less sensitive to the subscription price a vendor can set for content or to a merchant promoted by the service provider. By employing the stored user characteristics, the annoyance of ad bombardment "pushed" by the ad providers onto the user is reduced and the user can "pull" advertisements from ad providers based on the stored characteristics.

The techniques and system described herein might move influence toward the broadband provider and user to provide "negotiation power" to service providers as they supply broadband access to homes and users. Should the service provider choose to provide a device incorporating the techniques described herein, they might be able to obtain filtered information about content and merchandise with the user's permission. Armed with a large subscription base and the information, service providers could negotiate favorable carriage rights deals with many content and merchandise providers benefiting significantly from the upside.

Referring to FIG. 1, an exemplary block diagram of a physical system 100 similar to a Set-Top-Box (STB). The system might be a stand-alone system; devices embedded in a TV, Home or Residential Gateway, or exist in some other form. In one embodiment, this box contains: (1) Input/Output port(s) 102 to send or receive video data and other information through private or public network, (2) a computation platform or CPU 104 to run the processes, (3) a storage device 106 to hold user and computation data, and (4) an Output(s) 108 for display or to send information to a TV monitor. Additional hardware, such as system memory 110, an optional off-the-air or cable tuner 112, USB or other ports 114 for interfacing various devices, such as flash memories, and other input/output ports 116 for interfacing with a keyboard, mouse, etc. All of these are interconnected by structure 120, such as a bus.

In a first implementation, the source of videos and information is Broadcast TV (TV channels received by means of a tuner 112), Internet TV, video websites accessed through a broadband Internet connection to Input/Output port 102, and networked personal devices (media servers, phones, cameras, etc.) coupled to the system 100 by, for example, through the networked Input/Output port 102 or the USB ports 114. Other sources of video and information delivery, such as IPTV or mobile 3G/4G access, can be provided and do not change the inner workings of the system 100.

Figure 12:
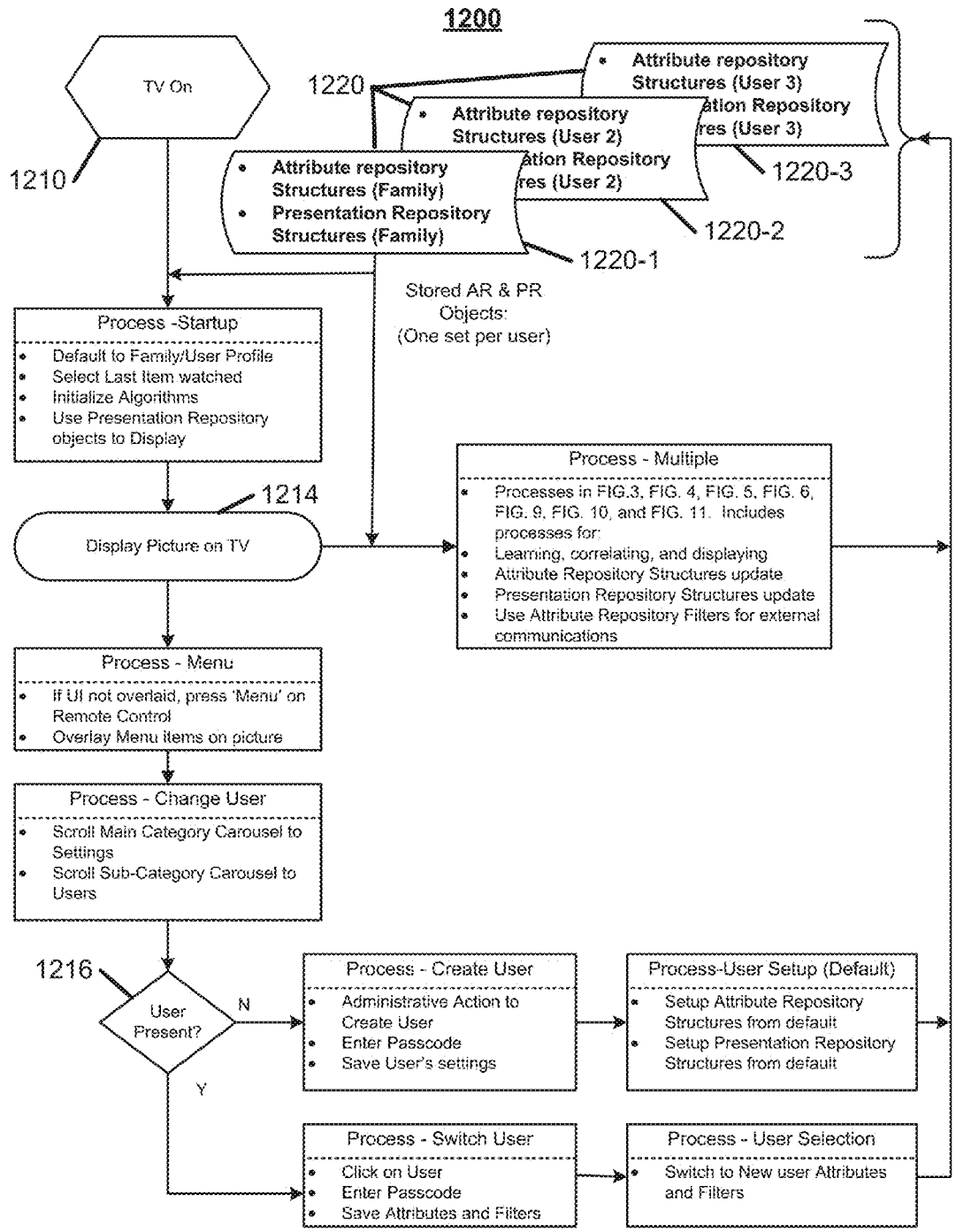
FIG. 12 is a simplified flowchart of an process for creating a new user.

In one embodiment, the system 100 operates on a "per-user" basis. A user can be a group, such as a family, or a single person, such as a father or a mother. As used herein, the components that hold (or store) key information that drives the processes are discussed as one per user. FIG. 12 later describes the creation of a new user in conjunction with the user interface (UI).

If the system 100 is implemented in a gateway or other physical system that has sufficient computing power and storage and is thus able to support multiple users with TVs, computers and other display devices, then the physical system can support multiple virtual single user systems enabling multiple users to be supported at the same time.

Figure 2:
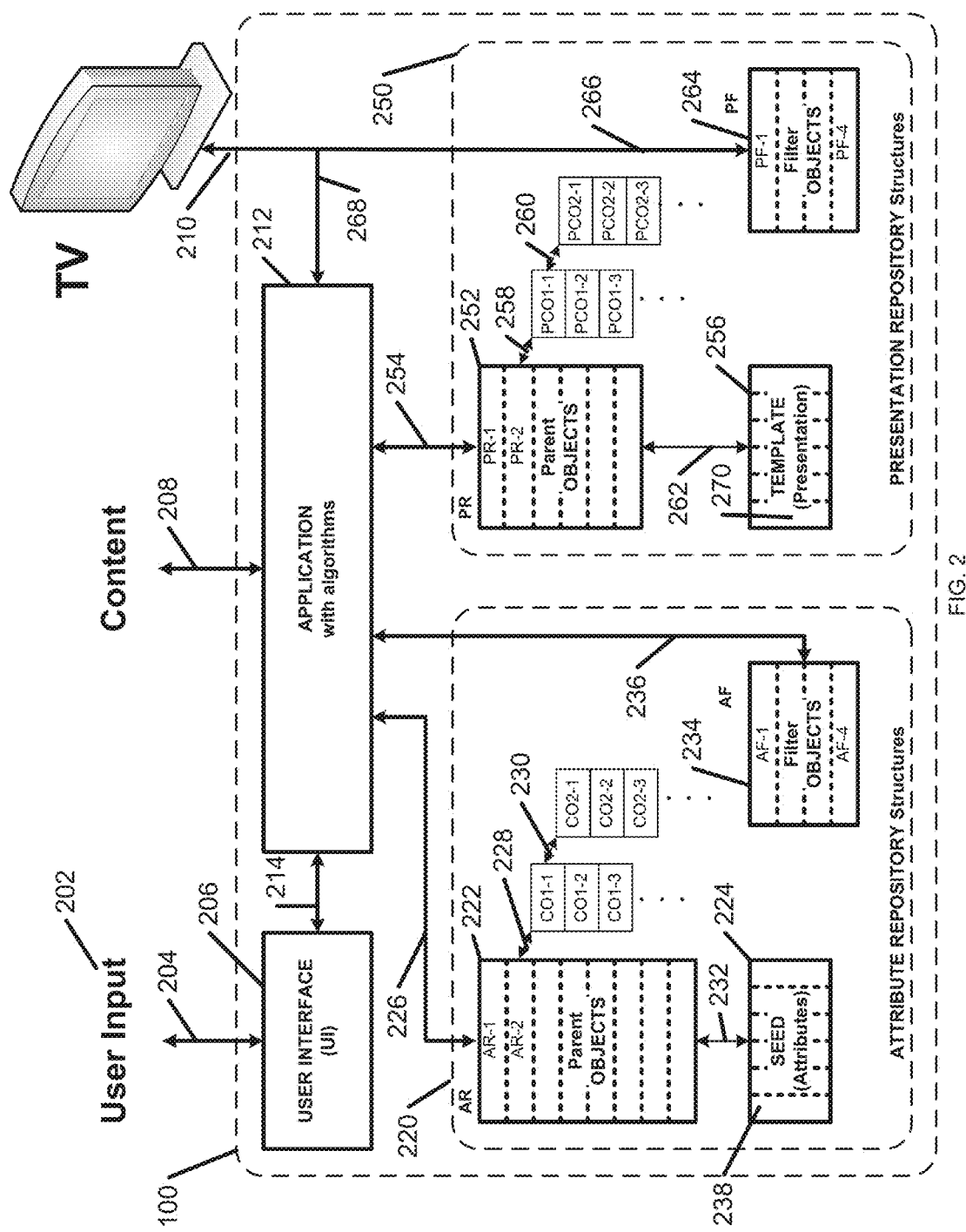
FIG. 2 is a functional block diagram of the system of FIG. 1 according to at least one exemplary embodiment of the invention.

FIG. 2 is a functional view of the system 100 of FIG. 1. The functional system 100 shows the function of the various components of FIG. 1, described below in the various embodiments, connected via numbered flow links.

In FIG. 2, a User Input 202 flows through flow link 204 connected to the User Interface (UI) 206 through which commands are sent to the system 100 using devices coupled to Input/Output (I/O) ports 102, 114, or 116 in FIG. 1. These devices may include remote control, keyboard, mouse, a smart phone or a tablet capable of issuing commands, a voice recognition module for voice based commands or a gesture recognition module for gestures based commands. Devices, such as smart phone or a tablet, have screens that can display commands and status in addition to issuing commands through touch screen or a virtual keyboard. In FIG. 1, these devices can physically interface with the system 100 through any input/output port.

FIG. 2 also shows content, such as video or Internet data, passing through flow link 208 connected to the system 100. The system receives content and sends requests and other communications using this link 208. The content can be any type of data including audio, video, streaming, text, or RF data that complies with the applicable interface standards. The standards include, but are not limited to, ATSC broadcast TV, DVB-XX TV, radio (MW, LW, FM, SW, HD, and Satellite), Internet protocol (IP) based TV, Cable TV, Internet Browser's supported protocols, and many more. In FIG. 1, all such content can come through any of the ports 102, 114, or 116.

The system 100 has an output port 108 through which content or commands are displayed to the user on a display 122. FIG. 2 shows the output passing through flow link 210 connected to a TV, such as monitor 122. The display can also be a screen if the system as defined here is implemented on the hardware of the display device such as a Smart TV or tablet. The system output through flow link 208 can also be to a network through any of the ports 102, 114, or 116 in FIG. 1.

The Application 212 in FIG. 2 is the process that sends and receives communication to the user through User Interface 206, receives content and sends request and network requested information through link 208, and displays output on the screen through link 210. The process uses Attribute Repository Structures 220 and Presentation Repository Structures 250 stored within the system 100 to perform computations and manage all communications.

The system has two primary modes of operation. They are: (a) Learn mode, and (b) Convey mode. Both of these modes use structures labeled as User Interface, Application with processes, Attribute Repository Structures and Presentation Repository Structures shown in FIG. 2.

Learn Mode

In Learn mode, the system 100 uses structures 220 and processes to learn as much as it can about the user. In Convey mode, described later, the system uses all the information it has learned and stored up to that point in 220, matches it to the user, and using information previously stored in 220 obtains new information, best deals, and fetches or pulls in advertisements. The results are then displayed to the user as relevant content, results, and deals, and are more relevant recommendations that are not confined due to being obtained from a single website or a provider.

Consider a scenario in which a user is watching TV. The user uses a remote control to switch to another source of content, e.g., switching from an on-the-air TV broadcast to a streaming video from a website through the Internet. For this discussion, assume the new content is a movie with a well-known artist, such as "Famous Artist 1" as a star.

Referring to FIG. 2, the remote control input is received by the User Interface (UI) block 206 over flow link 204. The UI block 206 causes the Application block 212 to start through flow link 214.

The Application 212 determines what needs to be displayed to provide the user the desired programming. This is described under Convey Mode later in this document.

In the Learn Mode, the Application 212 uses blocks in box 220 labeled "Attribute Repository Structures". The first block is Attribute Repository (AR) 222 that contains Parent objects labeled AR-1, AR-2, etc. Linked to a Parent object AR-2 through link 228 is the Child object CO1-1. Linked to the Child object CO1-1 is another Child object CO2-1 linked through link 230. The links 228 and 230 are forward and backward links. Each AR object could have multiple links. Multiple links means that the AR objects points to more than one child object list. The Attribute Repository Structures 220 might be implemented as a database with hierarchical objects residing in the system or in another location. It might also be implemented as a collection of files and directories. Other structures within 220, namely Seed 224 and Attribute Filter (AF) 234 might be implemented as database or a collection of files and directories.

Figure 3:
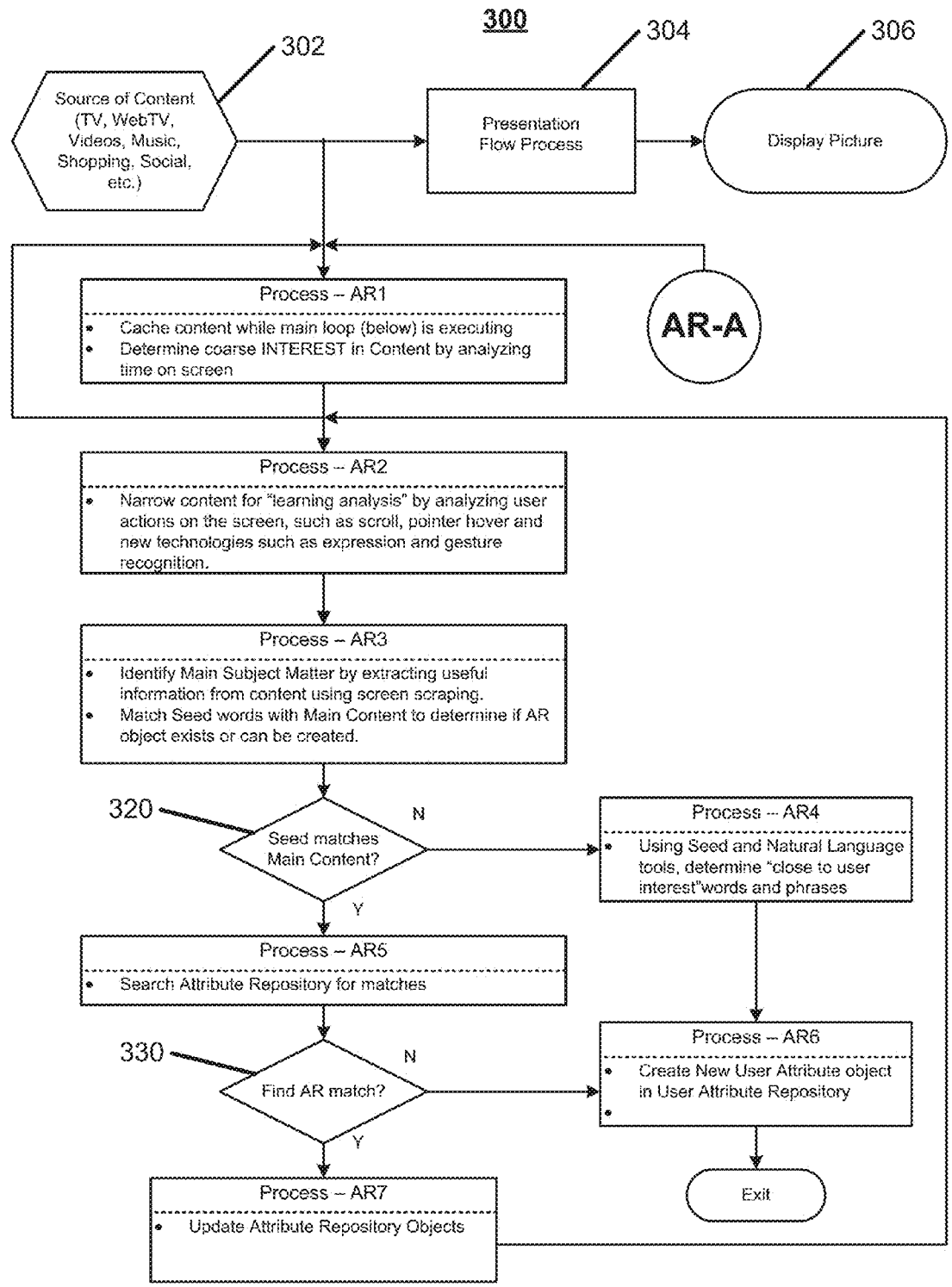
FIG. 3 is a simplified flowchart of a Attribute Repository management process.

A Parent AR object, e.g., AR-1, AR-2, etc., in AR 222 describes a characteristic or interest of the user that matches with how the product will be used. In one example, the system 100 is used as a television. The things a television is most suitable for at home are called its "usage classifications". The initial focus for TV usage classification is entertainment, commerce, social media, and advertisements. The Child object CO1-1 describes a property of one of the usage classifications that is linked to a Parent object AR-2 in 222. As an example, if Parent object AR-2 represents a user characteristic of movies owned or liked, then the Child Objects CO1 might represent a list of the movies the user owns or had watched with CO1-1 Child Object describing the first movie. Child Object CO1-2 describes the second movie, and so on. Child object CO2-1 represents a second level characteristic of Child object CO1-1, linked through link 230 that is one of the "items" about the movie CO1-1, the user owns or likes. The Child Objects are created for items user has shown interest in through explicit searches, clicking on related items, and so on. Child Object CO2-1 may represent an artist in the movie the user likes, CO2-2 represents a location where the movie was filmed and the user has shown interest in places, CO2-3 may represent a product that was shown in the movie and the user characteristics show inclination towards such products. AR Structures 220 does not show it, but it is easy to see that another level of child objects linked to any one of the second level child object (AR Structure 220 shows CO2-1, . . . ) would further expand on the items reflected in the second level child object. This can go on until an explicit product, service, or an advertisement has been identified. The linked AR objects, beginning with a Parent object AR-2 and terminating at a last level of child object (FIG. 2 shows CO2-1), forms a chain that matches user characteristics with the lowest level of detail the system 100 has for the usage classification. The Child objects such as CO1-1, CO2-1 are links in the chain and as stated earlier, have levels. Level is the degree of how far removed an AR object is from the user characteristics represented by Parent AR object AR-2, and defines the "progress" the system has made in matching the user characteristics to the usage classification. A list of words and phrases that facilitates matching the characteristics and properties of the user and products, services, social media and the advertisements at each level is provided in the Seed 224. The Seed 224 as seen in FIG. 2 is divided into compartments. Each compartment corresponds to a level in the Attribute Repository AR 222 consisting of Parent and linked Child objects. The first column 238 in the Seed 224 contains a set of words that defines user characteristics suitable for creating a Parent AR Object in the database. Other columns in the Seed 224 contain words that are suitable to create next level down (e.g. moving left to right) Child AR Objects. The algorithm in FIG. 3 identify "pertinent to content" and "close to user interest" words or phrases when it extracts information from accessed web pages and generate objects that are then stored in the AR Structures 220 database. The keyword that describes the characteristics is stored in the newly created AR object as well for match when algorithm in FIG. 3 and FIG. 4 are executed again.

Figure 7:
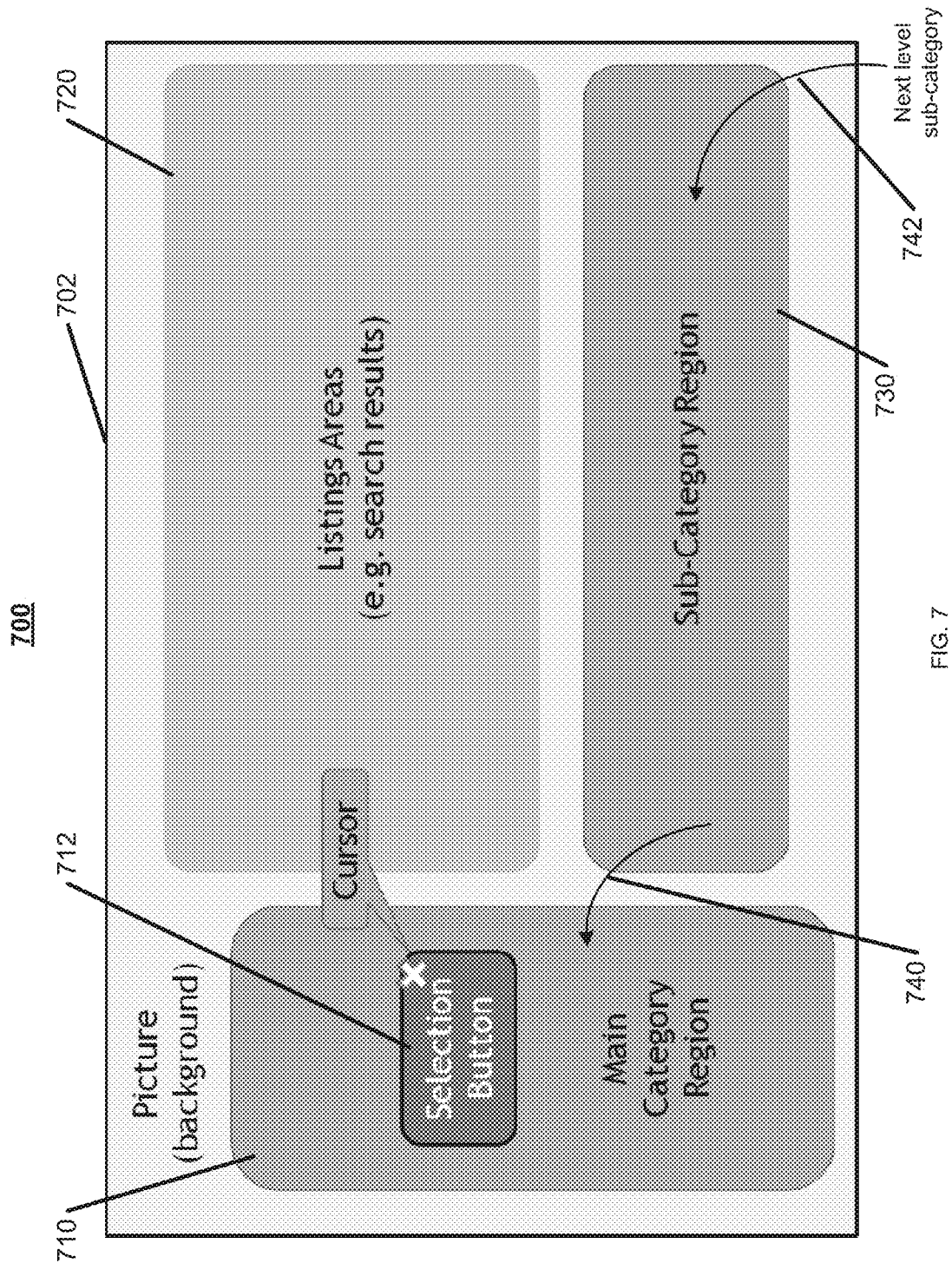
FIG. 7 is a view of an exemplary subcategory display.
Figure 8:
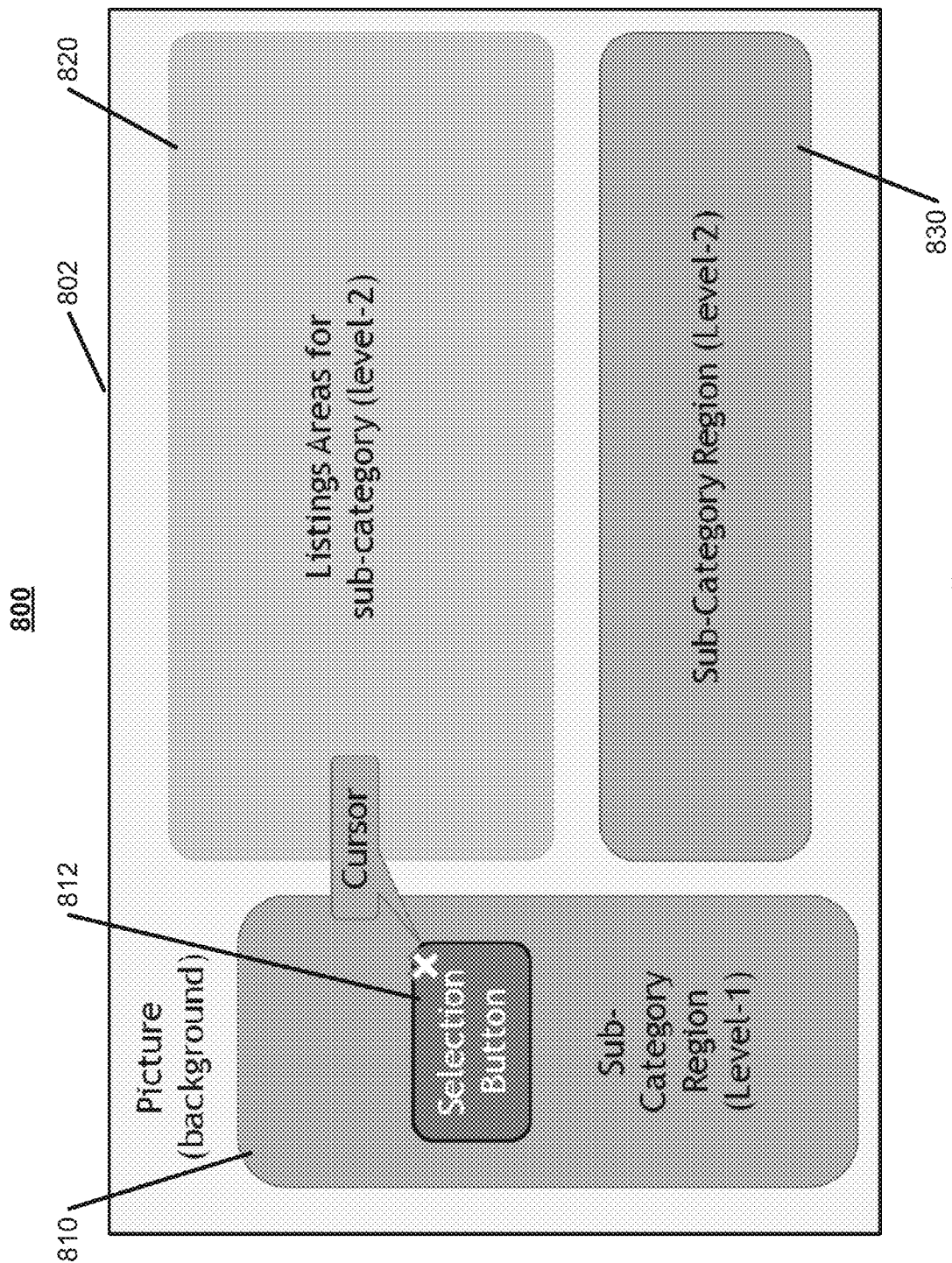
FIG. 8 is a view of an exemplary level 1 and level 2 subcategory display.

The usage classification of a product based on system 100 also dictates the user interface (buttons, choices menus, etc.) options presented to the user. During the learning process, each Attribute Repository object is created or updated with words or phrases defining characteristics, links to other AR objects, level in the chain, time when created, visit count and other such parameters. One such parameter is called the UI category tag. This tag is a constant and indicates where in the UI layout, consisting of categories with their own defined levels, would a particular AR object reside, should it be part of the UI. The UI categories are shown in FIG. 7 and FIG. 8. The UI category tag is provided through the Seed 224. Each word or phrase in each compartment in the Seed that matches the UI category is provided with the UI category tag. UI category tag in the AR objects improves the efficiency of the algorithm that correlates the AR objects with the Presentation Repository (PR) objects shown in the Presentation Repository (PR) Structures 250 in FIG. 2. The algorithm, shown in FIG. 11 and described in more detail below, updates the PR objects in PR Structures 250 based on the attributes in the AR Structures 220 in FIG. 2 so that the UI display better reflects the user's interests and preferences. In the Learn mode, the Application 212 looks at what was selected by the user thru the UI, for example "Movies", which as described later is a UI main-category item. Based on this, the application looks into information such as meta-data typically provided by the streaming server or movie database, or, if the content is streamed, other information and links on the page sent to the system 100 by the server. Extraneous information that is likely to be of questionable relevance or unrelated to user activity such as advertisements, promotions, and other such items are not used in this analysis. The key words and phrases are extracted and then analyzed by the Application 212 to determine its association with the user's interests.

To demonstrate association with multiple user's interests, Application 212 uses flow link 226 to find any Attribute Repository objects in the Attribute Repository 222 that match, or are semantically similar in nature to, the keywords or phrases the Application 212 has extracted from the content on the screen. When an AR object is created, the keywords responsible for the creation (user characteristics, product, advertisements, or service properties, etc.) are stored within. After a match is found between the keywords, the application uses forward and backward links, such as 228 and 230, to locate other linked Parent or Child AR Object(s). The linked objects may be part of a list, such as CO1-x and CO2-y shown in FIG. 2 where "x and y" are the position in the Child Object CO1 and CO2 list respectively, or a different Child Object list, such as Child Object CO25 (not shown), that through links, leads to a different parent object AR-35 (not shown) in AR 222. As time passes, there could be more AR objects linked to each other singularly, meaning through a single forward or backward link, or to multiple objects through multiple links. When an AR object is linked to multiple child object lists, it means that the information described by this AR object is "related' to other pieces of information described by the linked AR objects. As an example, consider the parent AR object AR-2 in 222 that represents "movies". The linked Child Objects (CO1-1, CO2-1) leads to another Child Object CO25-5 (not shown in FIG. 2) that identifies a location where the movie was filmed, e.g. United Kingdom. This set of linked AR objects, from AR-2 to CO25-5, represents one chain. A second set of forward and backward links in CO25-5 may point to a Child Object CO12-3 (not shown) which represents royalty. A different backward link from Child Object CO12-3 points to a parent AR object AR35 (not shown) in 222, which represent vacations. This set of linked AR objects, from AR35 to CO25-5, represents a second chain. Both these chains have one shared Child AR Object, CO25-5 that represents a location (United Kingdom). The chains enable the system 100 to associate user characteristics of movie with vacation through a common location, United Kingdom. Thus, by following the AR objects through links and forming chains, the system can form associations with all related user characteristics, and content, products, services, advertisements, etc.

In the example of movies with Famous Artist 1 as a star, the simplest way to describe creation of the AR structures in 220 and how they relate to the PR structures in 250 is if the AR parent object, e.g., AR-2 is Movies which also is a UI main-category item. The Child Objects CO1-1 would include the first movie the user owns or has watched that has the highest visit count. The child object list CO2 would contain information about the movie that the system learned and correlates to interests of the user. Such information may include: Famous Artist 1 name in Child Object CO2-1, director name in CO2-2, book in CO2-3, location in CO2-4, products endorsed in CO2-4, and so on. A child object list CO3 (not shown), that is linked to the Famous Artist 1 Child Object CO2-1, may contains additional information about the artist that interests the user. Such information would include personal information in Child Object CO3-1, such as age, height, weight, and other personal metrics. If the user is interested in family, a new Child Object CO3-6 (not shown) would be created and linked into child object CO3 list. A child object list CO4, linked to Child Object CO3-6 (not shown and reflecting family) would then contain the family information. Child object CO1-2 is an object that is linked to CO1-1 and points to the second highest visited movie. For each CO1 entry, the corresponding CO2 entries contain lower level objects that points to additional information. The system 100 creates child objects linked to each other within the same level (CO1-1, CO1-2 . . . ) and at different levels (such as, CO2-1) as it learns more about the user and the usage classification. A farthest level child object entry is created that contains an Internet link that typically completes the chain that links user characteristics with a particular product, service, or advertisement. The system 100 does not store any detailed information internally as the information can become stale. Generally, the newest and the most up-to-date information are procured using the Internet links.

To illustrate a different way of creating and linking the structures, the Parent object AR2 could represent "Favorite Artists". In such case, the entry CO1-1 would contain the name of Famous Artist 1 as the most visited artist. The entry CO1-2 would be the next most visited artist, such as Famous Artist 2, and so on. Child object CO2-1 for Famous Artist 1 would contain other items that are specific to the artist and were found to match the user's interests for which another AR object exists. Example of one such interest would be fashions. Others include: Movies, Family, Charities, etc. represented by Child Objects CO2-2, CO2-3, and so on. Each one of these items would have a link that may point to third-level Child Objects CO3. As an example, the third level Child Object for movies would have CO3-1 object reflecting the most visited movie starring Famous Artist 1, the Child Object CO3-2 would have the second most visited movie starring Famous Artist 1, and so on. Each movie Child Object would have links that would be pointing to the fourth level Child Object CO4 chain representing information about the movie that the system learned and which correlates to the interests of the user. With such objects and links, the system essentially have developed means to link interests of the user with content, products, services and advertisements that the user may be interested in.

The size of storage 106 in FIG. 1 available in system 100 and how much of this storage is required to run the functionality of a STB or a gateway determines how much storage space can be allocated to structures 220 and 250 in FIG. 2. The limit on the size of structures 220 and 250 is preset by the vendor who makes the product, such as a STB, that uses system 100. When the system 100 reaches the limit of the storage allocated for structures 220 and 250, it can, (1) "age out" the oldest entries in structures 220 and 250 and use that space to create new ones, (2) it can archive the older entries to cloud storage or other networked storage and retrieve them when needed, or (3) it can request user to manually increase the space or discard some entries. Other methods can be used. In one embodiment, the Application 212 uses method (1) where it automatically removes the older entries to create new ones.

As described above, the Application 212 begins the process over flow link 226 by matching keywords it has stored in all the AR objects in the AR Structures 220 with words in the meta-data associated with content or the web page on the screen. This matching enables the Application 212 to identify user's characteristics that is pertinent to content or the web page on the screen and to identify other information that can be smartly presented to the user. If a match was found, the Application 212 has found something about what the user is currently seeing on the screen and associates that with information it has already learned. If a matching AR object was not found, the Application 212 determines "close to user's interest" information from what is being displayed on the screen which will then cause it to create a new AR object in AR Structures 220.

Not finding a matching AR object in AR Structures 220 means that the system 100 does not have knowledge or information about what is being displayed on the screen. The Application 212 uses flow link 226 and 232 to use the Seed 224 to match any of the words in the Seed with words in the meta-data for the content or the web page on the screen. If any of the words in the Seed 224, in any of the compartments or AR child object levels, the first of which is labeled 238, matches the words in the meta-data or the web page on the screen, then the meta-data or the web page has information that matches the usage classification provided for the system 100. In the example, the usage classification is a TV. A match with the Seed indicates that an AR object can be created in the AR Structures 220. If there was no match found between any of the Seed words and the meta-data associated with content or the web page on the screen, then the Application 212 uses natural language tools available over the Internet or as separate application to determine keywords in the meta-data or the web page on the screen and then compare these keywords with words in the Seed 224 that are semantically equivalent to determine if the new keyword would create a parent AR object or a child AR object. Once the corresponding AR object is created, subsequent searches would create its relationship (such as links) with other AR objects as the system continues its learning process. After creating the AR object, the new keyword is added to the Seed in the compartment that is semantically equivalent to the new keyword. Using the Seed in this way might decrease the time required to determine a new characteristic that has not yet been entered in the AR as an object. Natural language and semantic determination takes longer and is the way the system will determine a "new characteristic" of the user or learn about a product or a service if one was not found in the Seed.

Attribute Filter

The Attribute Repository Structures in box 220 also show an Attribute Filter (AF) block 234 with objects labeled as AF-1, AF-2, etc. Over time, the Attribute Structures 220 would contain considerable information about the user and about products, services, advertisements, etc. Some of the user information system 100 has learned will include personal information such as accounts, personal preferences, financial inquiries, behaviors, religious or sexual bias, favorites, etc. The information can be displayed to the user to show what the system has learned. Limited information, such as account sign-in, products or services searched, is conveyed to the outside world to request content, more information, or to provide analytics data to vendors and service providers as part of additional service or as some sort of a business arrangement such as a subscription or discount. The amount of information sent for display or to external vendors is controlled by the Attribute Filter 234.

The Attribute Filter 234 is provided with key objects by design based on the product usage and the business arrangements. The business arrangements define the communication objects developed based on the businesses or service provider's needs and the services they offer. A user might be able to modify permissions saved in the AR objects in 222 as one of the parameters, add, or delete communication objects (i.e. protocol packets parameters) in the AF 234. Display and certain minimum personal information objects, in one embodiment, cannot be deleted. Control of object properties is provided for those objects that can be displayed or used for external communication or both. The Application 212 communicates with the Attribute Filter over flow link 236 in FIG. 2.

Examples of AF objects include:

(1) Attribute Repository pass-thru for display (AF-1). Generally, this object is not to be communicated externally. It provides parameters that permit display of all Attribute Repository objects in AR 222 and the Child Objects (CO1-1 . . . ).

(2) Search Result pass-thru for display. Generally, this object is not to be communicated externally. It provides parameters that enable listing of the search results by order as determined by the Attribute Repository.

(3) Seed pass-thru for display. Generally, this object is not to be communicated externally. It enables display of Seeds 224 so they can be modified, added or deleted.

(4) Personal Information External. This AF object lists personal information parameters that can be retrieved from the Attribute Repository and communicated to the outside world. This AF object's parameters can be added or deleted.

(5) Sign-in External. This AF object provides parameters that can be used to identify personal information in the AR personal information object that can be used to sign-in on the web, a cloud or a network.

(6) Business Object X.y. This AF object provides an internal ID "X", such as a reference to an AR object that contains the name of a business or a service provider, for validating a business name whose parameters can be communicated externally. The "y" defines the type of parameter that can be communicated. Examples of types of parameters include: number of times content browsed, number of times advertisement browsed, products purchased from business, etc. Other parameters may request some user information. That information will be qualified with the Personal Information External AF described above. If the user has not given permission, the information will not be communicated externally.

(7) Ad Object X.y. This AF object provides an internal ID "X", such as a reference to an AR object that contains the advertisement info, for validating the advertisement whose parameters can be communicated externally. The "y" defines the type of parameter that can be communicated. Examples of types include: number of times advertisement presented, number of times advertisement clicked, vendor site visited, vendor agent visited, product or service purchased, etc.

An example of an Attribute Filter 234 usage is information needed to sign in to a particular website. Such information is sent over the Internet. An Attribute Filter will limit the information sent out to the minimum needed to sign into the account on the website. Examples of such information are login id/email, password, gender, age/date of birth and location.

Other Attribute Filters are provided to pull in additional content from external websites. One of these filters will cause the request for more content to have limited information made available to a provider (e.g., a service provider, a content provider, or an ad provider) and specific to information being sought by the provider based on data in the parent or the child repository objects. An example of such a filter is a request to an OTT movie provider like Netflix or Hulu, where the user has an account, for the user's log-in information. Another example of such a filter is a request for advertisements where the system pulls-in advertisements from advertisement providers, and displays them to the user at the user's "convenient" time. A separate process, shown in FIG. 4, determines the convenient time to display the ad and the form the ad is displayed in (banner, streaming or pop-up) based on its criteria. An example of a convenient time to play an ad is when the user has hit the pause button during a non-live video playback (at which time the user is not focused on the content and would be more inclined to pay attention to the ad and "click" on it).

Figure 4:
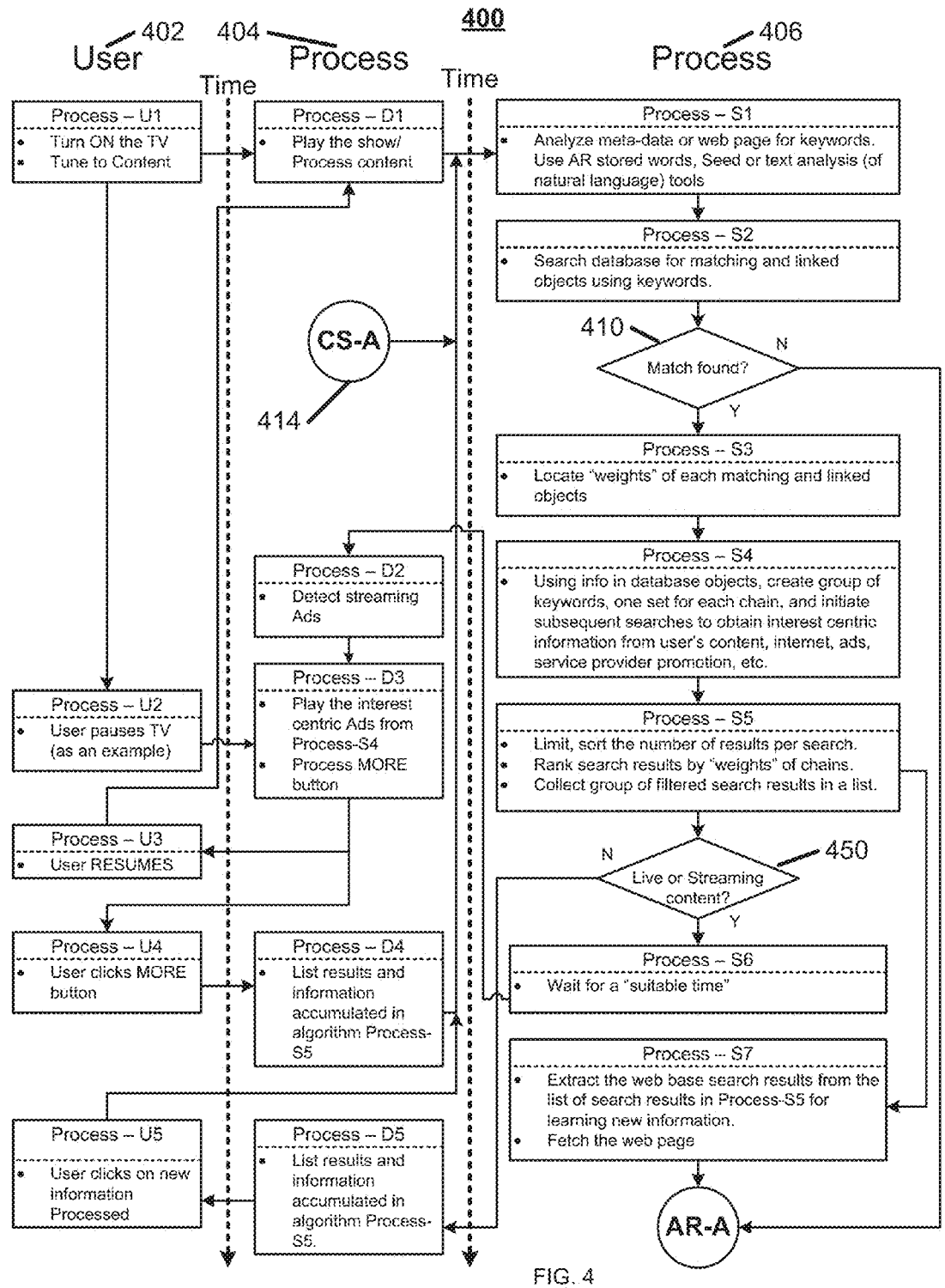
FIG. 4 is a simplified flowchart of a user actions and Search Flow Diagram process.

Similarly, during live video playback, a system 100 process shown in FIG. 4 can override the inline advertisements and play the advertisements based on the user's interests saved in the Attribute Repository as links. The advertisements to be played are accessed using Attribute Filters 234. Such advertisements are much more likely to be effective and generate meaningful "clicks" by the user, thereby providing a higher return on investment to the ad provider. This might be done where detection of live and in-line advertisement stream "start and stop" is permitted.

Convey Mode

Now consider an example in which a user is watching TV and uses the remote control to switch to another source of content. The new source might be another TV channel or a website.

In one embodiment, the system 100 presents a user interface navigation screen on display 122 so that the user can point to and click on a command button that offers the choices available to the user.

The system "creates" choices for the user by first learning about the user's characteristics (Learn Mode) and then providing content, additional information, deals and recommendations based on what it has learned. This results in a UI display in which the items such as the content of the buttons, listings, and results might be continuously changing.

The UI and its dynamic nature is managed and conveyed to the display based on the Presentation Repository Structures in box 250 shown in FIG. 2.

Similar to the Learn Mode, the remote control input is received by the User Interface block 206 over flow link 204. The UI block causes the Application to start through flow link 214.

In Convey Mode, the Application 212 uses the Presentation Repository Structures block 250. The PR 252 is a database with Parent objects PR-1, PR-2, etc., and Child Objects PCO1-1, PCO2-1 . . . , etc. residing in the system. It might also be implemented as a collection of files and directories.

Figure 13:
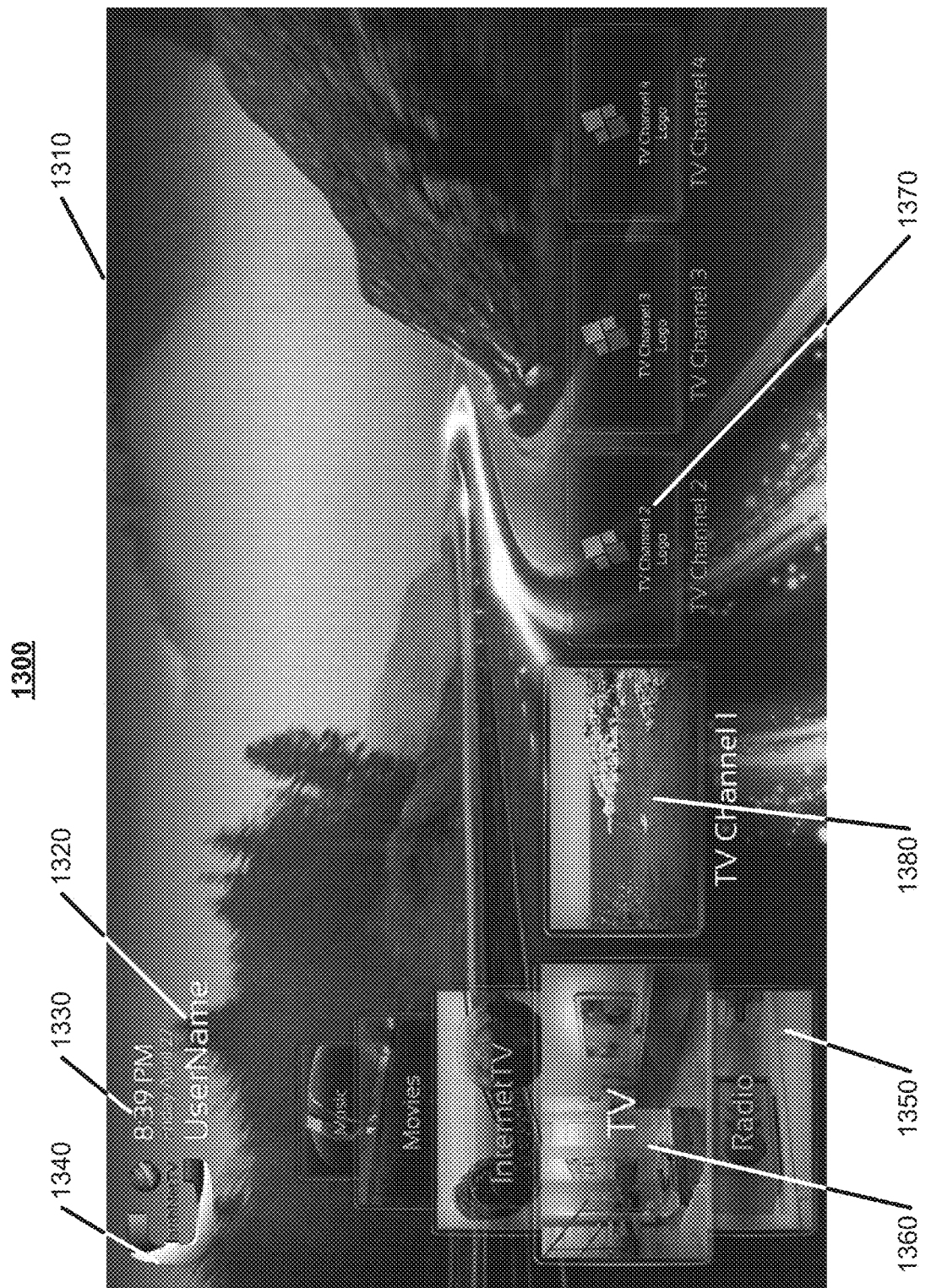
FIG. 13 is an image of an exemplary user interface overlaying a TV program image.

The PR objects are related to the UI and describe a "display or a screen" as it pertains to the usage of the end product, which in this example is television. Each UI screen, an example of which is shown in FIG. 13, might have multiple buttons, each represented by an object in the Presentation Repository. For example, the display consists of items suitable for a defined usage, such as watching a TV show or a movie, and is facilitated by the PR objects.

The PR objects change based on the changes the Application 212 makes in the Attribute Repository Structures 220 that reflect the user's characteristics and the interest the user has in content, products, and services. A change in user interests in turn might cause new content to be reflected in the buttons, the order in which they are displayed on the screen, or the commands and navigation presented to the user when buttons are pressed on the remote control.

The Application 212 looks at the UI selection and, using flow link 254, accesses the Presentation Repository Structure 250. A Presentation Repository object exists in the PR as a Parent Object 252 that reflects one of the main categories defined in the UI usage model. The Parent Objects are labeled PR-1, PR-2, PR-3, etc. As an example, for entertainment the parent objects might consist of TV, InternetTV, Movies, Music, Games, etc. For commerce, the parent objects might consist of shopping stores, auction houses, discounters, merchandise processors, etc.

The Presentation Repository Structures 250 in FIG. 2 shows Child Objects for each parent object. Child objects are accessed using flow links 258 and 260. After selecting the parent object, the application accesses the Child Objects using these links. These Child Objects lists are labeled as PCO1, PCO2, etc. There may be more (or less) Child Objects list per parent object.

Child objects contain the "next level down" information that is linked to the parent object. In FIG. 2 PCO1-$x$ is the first level Child Objects and PCO2-$y$ is the second level Child Objects where x and y is an integer greater than zero, e.g., 1, 2, etc.

In the movie example, the Child Objects can be used to reflect multiple ways movie choices can be displayed on the screen. For example, the first level Child Objects PCO1-$x$ might represent genre and the second level Child Objects PCO2-$y$ might reflect the movies available in each of these genres. In an alternative embodiment, the movies are organized by location where movies owned by the user are presented first (hard disk, DVD, Media server, etc.), followed by Streamed Free (user has accounts at places like Netflix, Hulu and so on), followed by Available for Sale (priced websites, DVD by price, etc.). In this case, the Child Object PCO1-$x$ would show the listings criteria just described. Child Objects PCO2-$y$ would then show the movies available under each of the listed criterion.

The flexibility in the parent object and the corresponding Child Objects and how they are structured provides multiple ways a display can be made of UI choices without re-engineering the entire User Interface. If there is only one Child Object list, then the display would be flat, i.e., the display will consist of just one list. If there are multiple Child Objects that are linked, then the display will reflect the depth in navigation, i.e., each Child Object corresponds to a navigation click on the remote control. (For a television application, it might be desirable that most user navigations conclude in less than four clicks.)

Similar to the Attribute Repository Structure 220 showing the Child AR objects CO1-1, CO2-1 . . . , the number of Child Objects PCO and the depth (how many objects in each child) might be controlled by a limit on system 100 the vendor might have set on the Presentation Repository Structures 250. The limit might be set by design considering the usage model, business needs, and the size of the storage provided in the system 100.

When new PR objects are created in the Presentation Repository Structures 250, as previously discussed, the new objects might require new items to be added to a UI navigation page or screen and suitable navigation links defined in order for the newly created items to become part of the remote control operations. The Application creates the new entry using Template 256 and flow link 262. The Template 256 is a pre-defined shell for the UI layout that is provided based on the usage classification for the system 100. In the example, the usage classification is a TV. The TV usage and the features it provides, e.g. watch broadcast or IP TV channels, InternetTV channels, Internet based streaming services, shopping portals, Internet searches, etc., defines what the UI would contain as buttons and the navigation. A possible layout of the UI and how the different buttons are placed in categories is described later with FIG. 7 and FIG. 8. The primary selection in the UI is provided in the main-category and corresponds to first compartment or level 270 in the Template 256. Application 212 uses data in the first compartment 270 in the Template 256 to create Parent PR objects in PR 252. The PR objects in 252 then show up as "main-category" buttons and navigation in the UI. Further selection buttons on the UI within each main-category, called a sub-category, is provided through the Child Objects PCO1-1, PCO1-2, PCO1-3, etc. that are created using lower level templates shown to the right of parent PR object template 270 in the Template box 256. If the UI specifications require further selection within the selection buttons represented by Child Object PCO1 list, then that selection, referred to as level-2, is provided through Child Object PCO2 list. Navigation links for parent and Child Objects are created by linking the new parent object item in the Presentation Repository 252 with the child items using flow links 258 and 260. If the PR parent object already exists in PR 252, the child items are added by linking to the new item in the Child Object list PCO1 and, if applicable, PCO2 as shown in FIG. 2.

Presentation Filter

The Presentation Repository Structures in box 250 also show a Presentation Filter (PF) block 264 with objects labeled PF-1, PF-2, etc. The Presentation Filter is provided to enable the application to make PR objects in PR Structures 250, representing the UI items, that conform to the screen of the attached display connected through flow link 210 (to the monitor 122 in FIG. 1). This is accomplished through flow links 266 and 268. For example, UI items displayed on a High Definition TV with 16:9 aspect ratio would have a different layout compared to a Standard Definition TV with a 4:3 aspect ratio. If the user interface is also sent over a network as a separate data stream to be overlaid at a remote terminal, such as when the system is operating as a gateway and a remote terminal attached to a TV is performing the display, then the filter object would contain properties of the interface of the attached terminal. These properties would be used by the Application to send the "data packets" over the network to the remote terminal using flow link 208.

The Presentation Filter 264 is provided with objects based on the type of displays it is directly attached to, or the remote devices it can send or receive data to render or the UI interface to overlay on the display. The type of display can be determined by universal plug-and-play (uPnP) techniques or explicitly entered by the user if the display is an analog TV set. In the event the system discovers a new device, the Application 212 uses a PF Template and fills it with new device particulars. It then stores the Presentation Filter object in the PF Block through flow links 266 and 268.

For a TV, the PF filter object could include properties such as resolution, aspect ratio, 3D capability, refresh rate, etc. For a network, the objects could include remote device identification, type of interface (TCP-IP, USB, DLNA, etc.), packet parameters, and so on.

Database

To implement the data structures described above and manage the relationships between them, a proprietary or a commercially licensable Database Management Systems (DBMS) such as Microsoft Access, SQL, or a similar product, is used.

In FIG. 2, the AR and PR Repository objects consists of many Tables that are linked together to form database objects and to form the relationships. The tables, their relationships, and the data (or records) are created and managed by the Application 212.

Although it could be implemented in a number of ways, in one embodiment the description uses one database per user for simplicity and to manage each user if the system has multiple users. In an alternate embodiment, one database is set up for the entire system and to provide access to each user through individual user identifiers or User_IDs. The structure of the AR and PR would then have tables to access the right objects using these User_IDs.

Attribute Repository Structures Algorithms

The Attribute Repository Structures 220 is used to hold information on the user's interests and on content, products, services, etc. that best suits those interests. The system 100 learns more about the user over time as it tracks the user as he or she watches content or searches the Internet for information. If there is little or very limited user input during searches, and the display is primarily TV, most of the information contained in the repository will be entertainment objects and biased towards TV. If the user has been looking for information in many places, the information saved will be equally diverse.

In addition to what is described above, FIG. 2 also shows an exemplary functional system diagram of the overall system and its operation with respect to learning and display. The processes in the Application are now discussed.

FIG. 3 is an exemplary flowchart 300 showing the various Application processes that manages the Attribute Repository Structures 250 and enables the system 100 to learn from the content.

Content received through one of the input ports in FIG. 1 is received by the Application through flow-link 208 as shown in FIG. 2.

In FIG. 3, this content comes into the system at step 302, passes through Presentation Flow Process 304, and is displayed on the screen in step 306. The path shown is for flow links 208, 268 and 210 in FIG. 2. The Presentation Flow Process 304 consists of receiving the content, decoding it using a suitable decoder and then rendering it on the screen.

Within the Application and for the Attribute Repository, content identification such as the URL, meta-data, and additional information is cached every time the content source changes. The content source could change, for example, if the user is flicking through TV channels, video-on-demand channels, or web pages, pauses for a few seconds to glance the content, and then continues to new content.

The process AR1 depicts caching to prevent incomplete updates or instability if the previous update of the Attribute Repository is still in progress.

In order to provide efficiency and identify the content that changed and generated user interest, each "changed content" is tagged with a click-on and click-off time. The content with the longest watch-time (click-off minus click-on) generated user interest that would be used to "learn" about the user and the content. Content with very long playtime (e.g. movie) will be updated once after the previous AR update completes since the system did not register a content "change".

If more computing power and larger storage is available, the system can cache more content with ever-shorter watch times until it reaches a Screen-Scan time. Screen-Scan time is defined as a time when a human gets turned off by just glancing at the content and clicks to another channel. This time is learned by the system. Content in the cache with Watch-time less than the Screen-Scan time is not used for learning.

Process AR2 in further analyzes to determine if the content passed from process AR1 has more focused user interest by determining, if the page is being scrolled, where the pauses are to determine user's interest and the position of the pointer which may indicate which content made the user curious. In the future, user facial and gesture recognition, eye tracking, etc. can be used to determine likes and dislikes in a similar fashion. The process "narrows' the target content that will be used to determine the user's interests.

Process AR3 takes the content that could potentially be interesting to the user and extracts more details from it. If the content is live such as TV or IPTV, additional information is obtained from the meta-data or extracted from the Electronic Programming Guide (EPG). If the content is from a web page, then a succession of techniques is used to quickly determine the words and phrases that would match user interests. First, screen-scraping technology is used to determine the main content such as video, text, pictures and games, etc. Other items on the screen, such as banner advertisements, promotions and pop-ups are eliminated from the processing since they are not the main subjects to determine user's interests. Secondly, the words in the Seed 224 are compared against words in the main content to locate the matching to user interests' words. In step 320 if there is a match, the system learns that the main content is useful for determining user's interests and that the matching words would be suitable for AR objects. Additionally, the matching words in Seed provide the level information for each of the AR object that either exist or need to be created. The level information is used to create links with other AR objects to form a chain that provides meaning and details matching the user characteristics with the products, advertisements, and services information that interest the user.

If the main content returns a no match with the Seed words, then in process AR4 text analytics and information extraction techniques are used to zero in on key pieces of information contained within. Text Analytics involves lexical analysis to study word frequency distributions, pattern recognition, tagging/annotation, data mining techniques including link and association analysis, visualization, and predictive analytics to turn text into data for analysis. Information Extraction automatically extracts structured information from unstructured and/or semi-structured machine-readable documents. Primarily this activity concerns processing human language texts by means of natural language processing. Commercial and open-source software such as, IBM Languageware, Lexalytics, General Architecture for Text Engineering (GATE), Apache UIMA, RapidMiner, and others are available to perform such functions.

Potential candidates of text analytics software have a broad collection of data mining algorithms that can take some time to execute. To speed-up the computation and quickly converge on key words and phrases that match the usage classification of the system 100, process AR4 uses two sub-processes. In the first sub-process, Attribute Repository Seed 224 is used to see if any of the words or phrases matches the key words in the meta-data associated with the content or the web page on the screen. If no match is found, then more computing intensive text analytics software is used to provide new user characteristics or "close to user interest" product and service information to create a new AR object.

If the main content returns a match with the Seed words in step 320, then process AR5 is used to search the Attribute Repository database. The process of finding a match with parent and Child Objects was described earlier for FIG. 2 and in the Learn Mode.

It is possible that a match from process AR5 is not found in 330. If so, process AR6 creates a new Attribute Repository objects as described earlier in the Learn Mode.

If in 330 a match is found, then process AR7 updates the objects in the Attribute Repository Structures 220. As described earlier in the Learn Mode for FIG. 2, the update may include adding new Child Objects to the already existing Parent Object.

Once the process is completed, the system loops back to process AR2 to begin analysis of the next content in the cache.

Searching

A user can initiate search while watching content on the TV or explicitly through the user interface because he or she wants to find some information.

In either case, the search and the user actions are used by the Application 212 (FIG. 2) to not only provide user interest-centric results, but also to learn new "things" about the user.

The Application performs different kinds of searches in response to a user-initiated search. They are: (1) "Internet search" where the results are returned from the World Wide Web using search engines, (2) a "results search" which involves searching through the results returned by a search engine(s), and (3) a "local search" which involves searching in the user domain where the user domain consists of hard drives, media servers, other storage devices, and subscribed cloud(s).

In one embodiment, when the user initiates a search while watching TV, the search "corresponds" to the category that is sourcing the content being watched. Examples of this are searching for a TV show while watching TV, searching for music while listening to music, or looking for an item while shopping. The UI categories in these three cases are TV, Music, and Shopping, respectively. A search thus initiated would have a direct relationship with the user's Attribute Repository objects that correspond to one of these categories.

FIG. 4 is a flowchart illustrating the Search Flow Diagram for content on the screen. The illustration shows various processes, including user input and display processes, that Application 212 performs using components in the Attribute Repository Structures 220. These processes enable the system to learn, perform searches, and present selected results to the user. The flow diagram is divided into three columns 402, 404, and 406 with labels User, Display, and System, respectively, separated by two dashed lines labeled Time. The dashed lines between the columns depict flow of action or start of a process as shown by arrows from one column to the other after a very short time or when the user takes action. Each block in the flow has a label that is the action or the process name.

The flow begins with process U1 with a typical action a user may perform on a TV. In process U1, a user turns on the TV and then switches to watch some content. The process D1 displays the content user has tuned to on the display screen.

With the content on the screen, the Application 212 begins its process of analyzing meta-data or content on the web page for keywords using process S1. Meta-data is additional information that is typically provided with content stream. If there is content on the web page, key subject matter is isolated from other information, such as advertisements, for analysis.

The analysis consists of finding words or phrases in the meta-data or the content on the screen to determine if there is some knowledge in the system that could indicate a recorded user interest and other related information that can be used to make a decision on procuring additional content or information that is in-line or similar to the content on the screen and which could have a high user interest. Such analysis prepares the system to present the most beneficial information to the user at the requested or an appropriate time when the user is most likely to take a favorable action.

The analysis is done using a combination of steps. The speed at which the analysis is done impacts how the user experiences the TV viewing.

Process S1 determines if the system has knowledge about the information on the screen or does the system 100 needs to learn. There are three sub-processes to determine this. They are (1) use keywords in AR objects stored in AR Structures 220, (2) use keywords stored in in the Seed 224 in AR Structures 220, and (3) use text analytics tools. In the first sub-process, process S1 uses the keywords stored in the Attribute Repository database and looks for matches in the meta-data or content on the screen. These matches indicate that there is recorded information in the system that matches or is similar to what the user is currently watching. In the second sub-process, the system compares words or phrases in the Seed 224 with meta-data or the content on the screen. The matched words generate a set of new keywords indicating that the meta-data or the content on the screen is new subject matter that is of interest to the user and matches the end usage of the product. In the third sub-process, the system uses text analytics and information extraction tools and the Seed 224 to extract words and phrases from meta-data and content on the screen to come up with words and phrases that are close or similar to the words and phrases in the Seed. This set of words would indicate a new interest by the user and the system will be learning the interests.

In one embodiment, process S1 might only run sub-processes until a first match, such as a matching AR object, is found and then go to the next process with one set of keywords. This might be fastest for the system 100 but it would delay the learning by system 100 of other information of interest to the user that may be in the content and which the system might have learned if it executed sub-process two (match in the Seed) and sub-process three (text analytics) on the content on the screen. In another embodiment, process S1 might run all three sub-processes to obtain one set of keywords per sub-process as explained above and then go to the next process where it begins the learning process based on the keywords found using all three sub-processes.

Process S2 uses the up to three sets of keywords generated in process S1 as follows. The second and third set of keywords created using sub-process 2 and 3 in process S1 indicates that Attribute Repository objects matching these keywords do not currently exist in the system. Thus, the system will be learning and needs to create Attribute Repository objects. The flow moves to the decision point 410 where "match found" is false. The flow then goes to entry point AR-A in FIG. 3 and control passes to process AR1 in FIG. 2 as described above.

If the first set of keywords in process S2 is a match, this indicates an existence of AR objects. In decision point 410, the "match found' is true and so the control goes to process S3.

The set of matching keywords is used to locate the AR objects and the other AR objects that are linked to them. Note that each AR object would contain keywords and other information as previously described. The levels in the Seed 224 as described before define how the AR objects are related to each. These AR objects, linked through forward and backward links, form a chain. The chain defines a set of AR objects linked together, that defines the interest of the user (highest level), to the most specific information on a subject (lowest level), and provides the "connection" between the user interests and the specific content, products or services. As previously described, the matched AR objects could also have multiple links pointing to other AR objects that leads to other termination points at the upper level and the lower level. Each of these sets of links forms a new chain in Attribute Repository Structures 220 in FIG. 2. The collection of these chains is the information system has learned about the user and the products and services that interest him or her. Each of these chains has a set of associated AR objects from where stored keywords are then extracted.

In process S3, the weight for each of the chain is computed. Weights are assigned to each AR object based on different criteria. The simplest criterion is the "visit count". Each AR object visit count is incremented by one, each time the AR object is included in a chain. Visit count alone may not be practical to suitably prioritize a user's preferred or interest based information. To provide such priority and a more efficient weighting process, persistent or "sticky" user characteristics are assigned sticky weights that do not change with visit counts. Examples of AR objects with sticky characteristics are content owned by the user, subscriptions or memberships to web sites, preferred websites where user has credit card information or web portals that are prioritized per agreements with the provider, merchant social media, or advertisers. Sticky weights have values higher than the range provided by the visit count. A higher preferred characteristic is provided a higher sticky weight value while a lower preferred characteristic is provided a lower sticky weight value. Note that all sticky weight values are greater than the maximum visit count to ensure that the computed weight of chains with sticky AR objects are higher than one with just the visit count. Sticky weight values are provided through the Seed and with each word defining the characteristics. They do not change except when explicitly modified by an explicit command.

Chain weights might be computed by simply adding the weights of each AR object in the chain, or in a more complex way by conditionally comparing the weights of each AR objects such that the most preferred chain receives the highest weight. By providing the sticky weights as described above and using the visit count from all other AR objects in the chain, a simple sum of all the weights of the AR objects in the chain is speedy and provides appropriate weights to the chains for the next algorithm.

In process S4 the keywords from each chain is extracted to form sets of keywords, one per chain. Using each set of keywords, the system initiates searches, one per set, for content on user's hard disks, other devices, and the "cloud", searches through preferred service providers or websites to locate content, products, services or advertisements, and through the Internet using commercial search engines such as Google or Bing. A more detailed description of various searches described here is provided later in association with FIG. 6. The system collects results for each of the search initiated until it receives the last result for the search corresponding to the last set of keywords.

In process S5 the group of search results obtained in process S4 is ranked using weights calculated for each chain in the process S3. The chain with the highest weight will have its group of search results listed first (ranked highest). This will be followed by the search result of the chain with the second highest weight, and so on.

Typical Internet search results from commercial search engines are ranked based on the algorithms and criteria known to the search engines providers. These results do not match the deep and private user interest knowledge system 100 has gained and is owned by the user. Presenting all the groups of search results accumulated in process S4 to the user on a TV or a personal device screen would be overwhelming and might reduce the user experience. Thus, in process S5 the results are filtered based on criteria such as highest traffic rating (e.g., such as an Alexa Traffic Rank rating provided by Alexa.com, an Internet traffic ranking service) or simply picking the first five (as an example) results for convenience so that all results can be presented to the user in a more concise way. Traffic ratings or other such criteria ensure that popular and most relevant to end product usage results are displayed, whereas convenience reduces computation and simply displays a predetermined number of top results. All filtered out results can be displayed on the screen following the group of ranked results should the user decide to scroll pages and pages of them.

After filtering the results within each group of search results, the groups are ranked in a list, beginning with the group that corresponds to the highest weighted chain. Thus, if the number of results in each group is limited to five (i.e., n=5), the user will see up to five results from the highest weighted chain, followed by up to five results from the next highest weighted chain, and so on. The rankings of results in such a manner ensures that the display will quickly show users results system 100 has found that corresponds to interests and the extensions to those interest and related to content, products and services.

In step 450, if the user is watching a live or a streaming content on the display screen, then control passes to process S6, during which a suitable time is determined regarding when to display the information the system 100 has gathered related to the content being watched and matches the interest of the user, and then control passes to process D2.

Process D2 is invoked when the system detects that a streaming or a live advertisement is about to start. Such detection is identifying a suitable time when the system can insert its own content. If such detection can be made, the system prepares to play the interest-centric advertisements out of the information it has gathered in process S5.

Process D3 is invoked following process D2 if the system detects playback of advertisements. The campaign-based advertisements being broadcasted or streamed live seldom match user interests and hence lack effectiveness. Instead of such advertisements, the system will play interest-centric advertisements from process S4 ensuring that they are highly relevant to the user and thus might increase the probability that the user will take a favorable action on them. In addition to the advertisements, a MORE button is displayed on the screen that the user can point to and click to request more information.

If the user clicks the MORE button displayed on the screen in process U4, process D4 will list the ranked results accumulated in process S5.

Since the information on the screen has changed following the execution of process D4, the system starts the process all over again beginning with process S1.

If, however, in process U3 it is determined that the user clicked the "Resume" button, content playback will resume when control passes back to process D1.

If the information being displayed on the screen is determined in step 450 to not be live or streaming content, the system displays in process D5 the ranked results accumulated in process S5. The exit from process D5 is to process U5 where if it is detected that the user clicked on one of the new information presented on the screen, the system starts the process all over again beginning at process S1.

The flow diagram 400 also shows a process U2 during which a user can "Pause" the content currently playing through a remote control. This is another example of a "suitable time" when the system can play its own content. Advanced STBs provide a function where the currently playing live or streaming content is continuously recorded so that if they are paused anyplace, they can be "Resumed" without missing anything. Assuming such a feature exists on the STB; the system will start playing the interest centric advertisements in process D3.

In addition to displaying information to the user, the Application 212 also begins the learning process as described above in the Learn mode. The process S5 has compiled and ranked the search results based on the keywords in the chains of AR objects and their weights. As previously described, weights include sticky weights that puts AR object chains with properties such as owned by the user, at a higher rank than the results from other chains where the AR objects properties does not include sticky weights. The process S7 looks at the group of ranked results from process S5 and focuses on the search results that do not have the sticky weights. This group of search results is based on the keywords provided by a chain of AR objects and is from the Internet. They exclude items that are already owned by the user (system 212 has knowledge about those items). Process S7 then fetches the webpage pointed to by the search result. The control then goes to entry point AR-A (to step 310) in FIG. 3 to begin the system 100 learning process.

Figure 5:
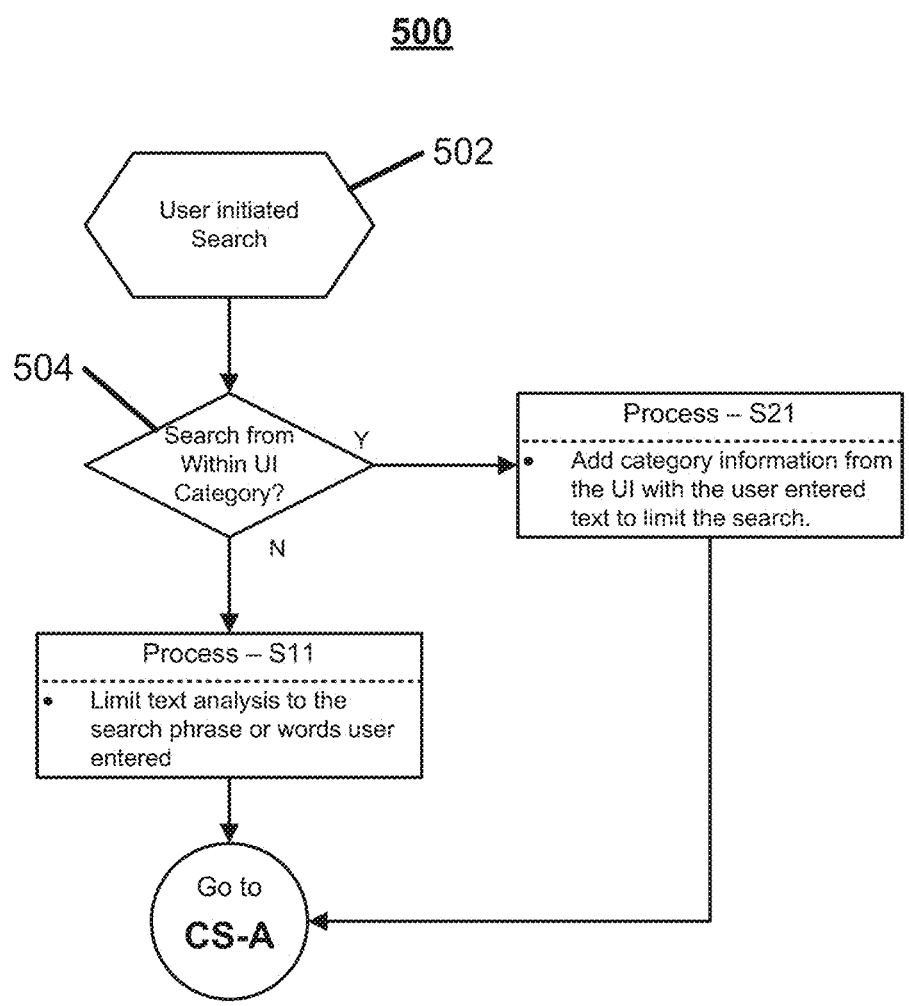
FIG. 5 is a simplified flowchart of a user initiated search process.

A user can also initiate a search through a "Search" category of the UI, which is a search for anything. FIG. 5 shows the various process steps 500 the Application 212 goes through in servicing such a search and how the system learns about the user's characteristics. Referring to FIG. 2, the User Initiated Search flow begins with an input received via a remote control over flow-link 204. The Internet search request and results are communicated over flow-link 208, and the search results are displayed through flow-link 210.

In FIG. 5, the flow begins with a user-initiated search in step 502. A check is made in step 504 to determine if the search was initiated from any UI main-category except Search. If it was initiated while in a UI main-category, then the search can be refined with the category. In this case, process S21 is invoked. Otherwise, this is a request for direct search and process S11 is invoked.

Process S11 is the first path when the user is looking for "any" information. Keywords and phrase would be extracted from the search words user entered. The process limits the scope of analysis to the phrase or words exactly as entered by the user. The system then goes to entry point CS-A (to step 414) in the Search Flow 400 of FIG. 4.

If the search was initiated from within the UI main-category, process S21 is invoked. This process appends the UI category information to refine the search. As an example, if the search was initiated from within the UI main-category of Movies, the word Movies would be added as another search term to limit the results to "movies". Similarly, Shopping UI category can be added to limit the search if the search was initiated from within the "Shopping" category. The analysis and the rest of the process will be followed through entry point CS-A (to step 414) in the Search Flow of FIG. 4.

Figure 6:
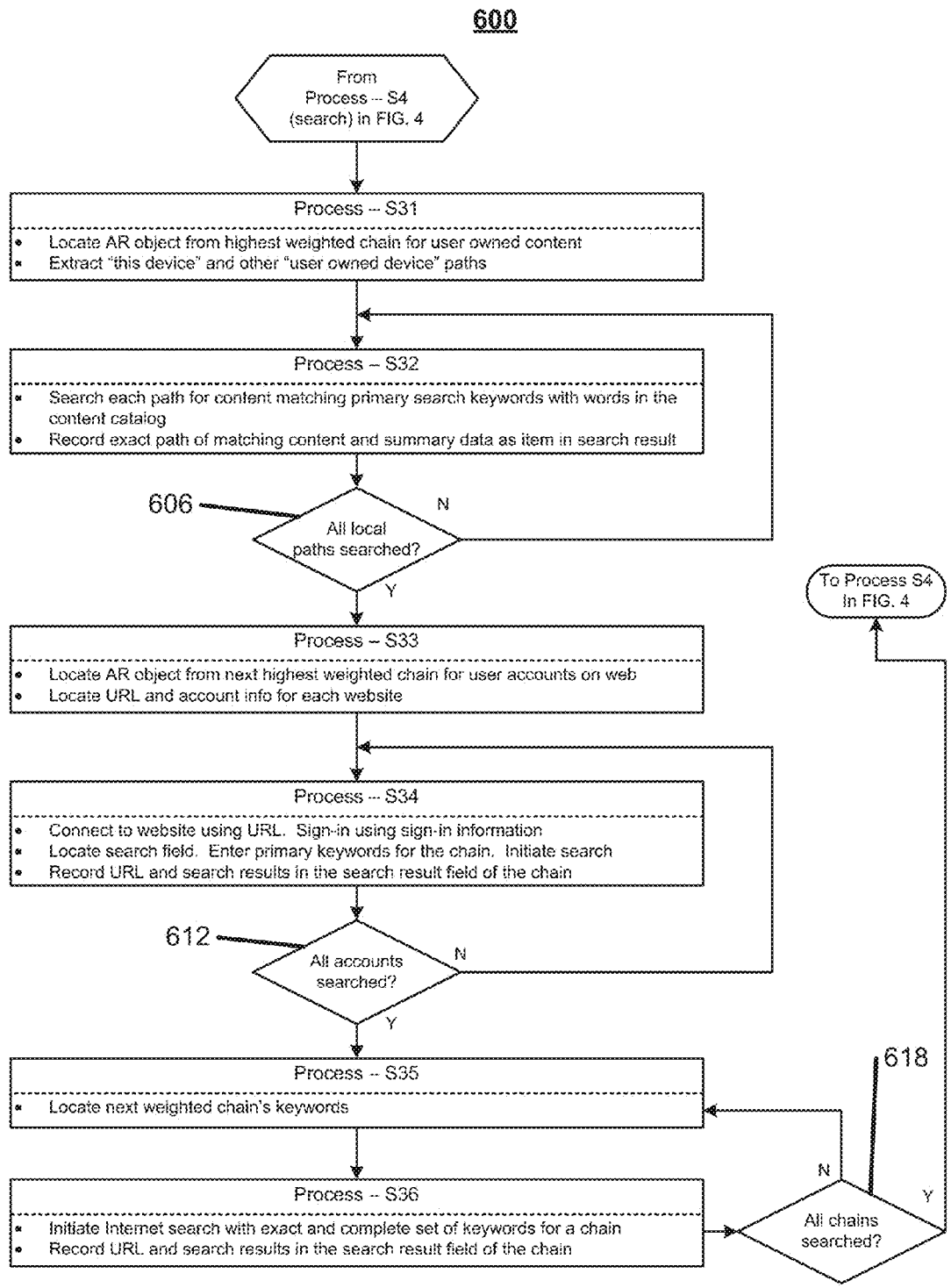
FIG. 6 is a simplified flowchart of an expansion of the search process of FIG. 4.

Process 600 in FIG. 6 expands on the search part of the process S4 in FIG. 4. As noted earlier, the system 100 conducts searches for content in the user domain, content on the websites through the Internet where user has accounts, and lastly, the entire Internet. The mechanisms for search are different in each of the three cases and are supported by the respective AR objects.

Assuming that content in user's domain has the chain with the highest weight, the AR object matching the user content would contain a path to the catalog directory or a file name that contains the list of user owned content and the path information. Path information consists of the directory and file names where the content is located on the hard drive, private networked path or mapping to other user owned devices, and the Internet address (e.g., URL, IP address, etc.) of devices that can be accessed over public network or through the Internet. In process S31 the AR object for user owned content is located and the device paths for all devices where content may be located is extracted. Next, in process S32 a search over each path (each device) is initiated to determine if there is a match between the primary keywords and the words in the content catalog. Primary keywords are extracted from AR objects in the chain that are tagged with key properties of the content. Examples of key properties of the content are title, artist name, etc. Primary keywords help in locating content where full set of keywords that also may contain user characteristics and other user centric information may not return a match. Until all the user's devices (e.g., storage 106) are searched, process S32 is repeated. Then control moves from step 606 to the next process S33.

Process S33 determines if the AR object in the chain show that user accounts exists. If accounts exist, the process locates the website URLs and the sign-in information. Process S34 then connects to the website using the URL and the Application 212 signs in using stored sign-in information. Next, the process locates the "Search" entry region of the website and enters the primary keywords in the search field. A search is then initiated. The result returned will contain primary information on content that are offered through the website and where user has an account. The process then records the URL along with all search result items returned in the chain's result group.

Step 612 forces the system 100 to repeat process S34 until content from all websites where user has accounts has been located. Then, in process S35, the next chain and the set of corresponding keywords is located.

Process S36 initiates an Internet search with the full set of keywords determined for each chain by process S4 in FIG. 4. The results returned are recorded in the search result areas of the chain whose keywords were used to do the search. If searches were not initiated for all the chains, the control goes to 618 and process S35 to perform the next search. If searches were initiated and all the results received, the control passes back to process S4 in FIG. 4.

An illustration will serve to better show what the user experiences: In this example the user is in the UI Movies category and searches for "Famous Artist 1". Using the user's Attribute Repository for Movies, the match finds "Famous Artist 1" and the path information for movies that may exist in the user's domain (hard drive, media server, other devices and the cloud) in one of the chains. Local content has the highest weight. Next, a restricted Internet search is done on websites where the user has accounts by automatically logging in (the log-in information was also retrieved through a match with Attribute Repository object in the next lower weighted chain). Lastly, the Application 212 will initiate a general Internet search with complete set of key words from the chain that better reflect the user's characteristics and the linked content, products, advertisements and services. The results returned are better defined and have a high likelihood of matching the user's interests or product usage.

The order of the search results presented to the user would be: (1) user owned movies with Famous Artist 1, (2) Websites where user has an account that offers movies with Famous Artist 1 as a star, (3) other sites offering Famous Artist 1 movies, DVDs with best deals listed first (with price set as a priority), (4) new movies Famous Artist 1 is in and trailers or description. Then, if the Attribute Repository has Child Objects in other chains for Famous Artist 1 (indicating other user interests) in fashions, events and gossips, the search result list would show, in rank order, (5) Famous Artists l's fashions, (6) events with Famous Artist 1, (7) gossip about Famous Artist 1 and so on.

Note that in describing the Learn Mode example of a movie with Famous Artist 1, the system learned about the artist's fashions and other commercial items and created Attribute Repository objects. In the example above, the links to these Child Objects would also be recognized by the system and the links to the websites of the merchants or products would be listed in the search result. If the user clicks on the pointer, that merchant or the product's website with specific product or model will be displayed.

Alternately, if the UI main-category was Shopping and the user entered Famous Artist 1 name in the search, the merchant and product related chains with AR object linked to the artist would be displayed first.

Presentation Repository Structures Algorithms

As previously described under Convey Mode, the display of the User Interface with its dynamic nature is managed based on the Presentation Repository Structures 250 shown in FIG. 2.

In the example of the display of the UI, main-category, such as TV, movies, or shopping is displayed as a group to make a coarse selection. If one of these categories is selected, then fine selection such as the names of the TV shows, names of the movies, or the names of shopping establishments is provided as a sub-category of the respective main-category for selecting the content. Navigation choices on the main and sub-categories are presented if the user moves a cursor to one of the choices visible on the screen and selects additional actions using an input device.

All of the structures in the UI are adaptive. Items can be added or deleted in the main-category, sub-category or the Listings. This capability is provided through the Presentation Repository structures 250.

The main and sub-category as well as navigation choices might be displayed as buttons, icons, listings, or a combination of any or all of them. The appearance of the display is typically a matter of choice of a business or manufacturer. FIG. 7 is one exemplary UI representation 700 of how the screen regions could be allocated for interfacing with the user.

The buttons, icons, and listings have several parameters associated with each of them. The parameters include the position and size of the buttons, e.g., button 712 shown in FIG. 7 as it would appear on the screen. Other parameters include the font of the text, a link to pictures or content; generally these parameters are not shown on the screen. The links typically point to a file name on local storage for speed however they could be pointing to a URL or a TV channel if the design calls for such items to be displayed in the buttons.

The main-category region 710 of the UI screen 702 is represented by a collection of Presentation Repository objects shown as parent objects in FIG. 2. Upon selection of a main-category button, linked Child Objects (FIG. 2) are selected that are presented as sub-categories in region 730 in FIG. 7. If a sub-category is selected and there are more choices, they are presented in the listings area 720.

The aesthetics of the user interface and how much information is presented on a screen for a TV experience or a mobile device varies significantly from screen to screen. Simple UI display, such as TV and TV shows, can be represented in the main and sub-category alone. An InternetTV listing that offers choices from around the world can be selected by region, genre, or language where the selection possibilities are provided in the sub-categories. The sub-categories further offer choices. Here, each region, genre, or language can offer more choices, possibly creating a complex presentation challenge to fit on one screen. It is possible to put these choices in the listings area 720. The listings area or the sub-category region 730 can then offer more choices that can make the screen very crowded.

The disclosed embodiments provide a method where very complex UI screen presentation challenges might be overcome in a way that preserves the TV "experience", i.e., the look and feel of watching conventional TV. The familiar screen and the presentation aesthetics are persevered and the user can simply page through multiple screens. These methods, in one or more embodiments, rely on Presentation Repository structures 250 in FIG. 2 with parent and multiple-linked Child Objects shown as PR 252 and PCO1-1 . . . PCO2-1 . . . respectively.

Too many rows and columns of buttons on the screen might make the UI very cluttered and provides a poor user experience. If the navigation calls for additional button choices when the UI screen 702 is already displaying current button choices, the Application uses next level down PR Child Objects to maintain UI aesthetics by moving or shifting the sub-category buttons in 730 into the main-category region 710, and displaying the next level down sub-category buttons (from the Child Objects) in the sub-category region 730. This action resembles a "shift" of previous sub-category region (level 1) to the main-category region, illustrated by arrow 740, and the shift-in of the next level down (level-2) sub-category region to where the previous sub-category was a level-1 sub-category, illustrated by arrow 742. With linked child PR objects, the aesthetics of the UI presentation 700 is maintained. The process can continue until there is content selection or the user exits. A "back" button on the screen (not shown) or on the remote control would cause the Application 212 to "walk back" through each screen (Child Object) to the main-category screen (home). A "home" button, if provided, would take the system back to the top level UI screen. FIG. 8 shows an example of the sub-category level 1 in region 730 in FIG. 7 shifted into the main-category region 810 with the cursor selecting the now sub-category selection button 812, in FIG. 8, and a level-2 of sub-category shifted into region 730 in FIG. 7 and appearing here in region 830 in FIG. 8.

Figure 9:
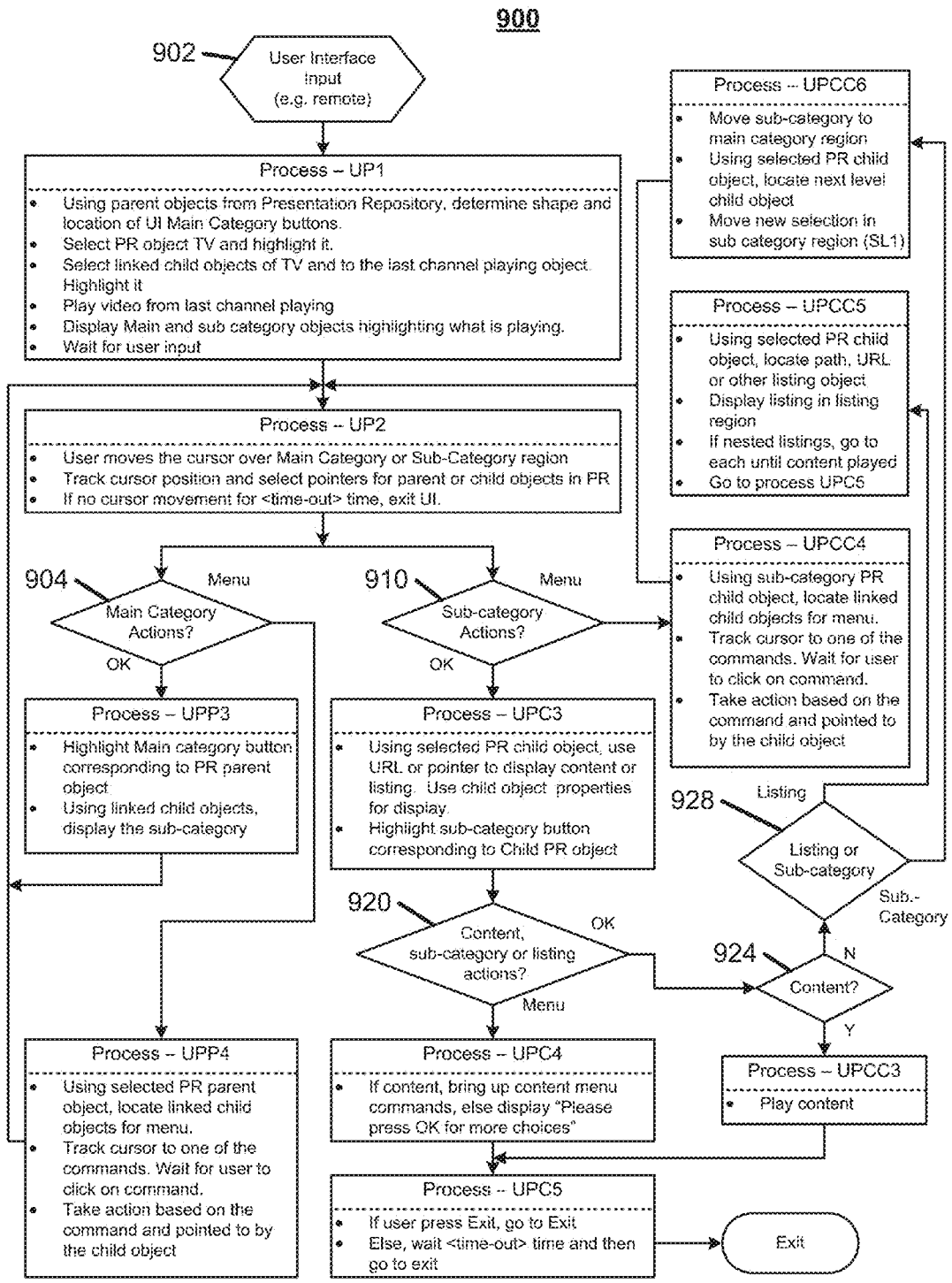
FIG. 9 is a simplified flowchart of a user interface actions.

FIG. 9 is an exemplary flowchart 900 which shows how the User Interface actions, through a remote control or the equivalent, work with the Presentation Repository Structures 250 and its objects to provide the UI display. To simplify the input device actions for illustrative purposes (such as from a remote control or a mouse), two generic action item terms, (OK) and (Menu) are defined for purposes of this embodiment. (OK) is synonymous with moving the cursor to a button or an item on the screen and clicking or explicitly pressing the OK button on a typical remote control. This action causes the system to "select" the item where "select" means that the item is highlighted to offer more choices, or to start playing content (such as a TV show or movie). The selection is represented by the Child Objects and in the simplest case might be represented by the linked list of the Child Object PCO1-1, PCO1-2, and PCO1-3. As an example, if the main-category selected was TV, then PCO1-1 would represent the first TV Channel, PCO1-2 would represent a second TV Channel, and so on. The parent or the child objects also have a second link that points to a second list of the child objects similar to the ones shown in PR structures 250 in FIG. 2. For parent object PR2 in 252 in FIG. 2, this set of Child Objects would be PCOM1-1, PCOM1-2, and PCOM1-3 (not shown in FIG. 2). They are at the same level as the Child Objects PCO1-1, PCO1-2, and PCO1-3. These second set of Child Objects provides the Menu button choices. (Menu) means pointing the cursor to a button or item on the screen and then pressing the (Menu) button on the remote control. This action causes the system to show additional navigation choices or selections.

The flow 900 begins execution with an action performed in step 902 using an input device. Process UP1 in the Application 212 locates the parent objects in the Presentation Repository Structures 250, shown as PR 252, and determines the physical characteristics of each button in the UI main-category. Any of the PR parent objects can be provided with the default property of appearing highlighted when selected. For the product usage of TV, the default is the TV button. It will appear highlighted when the UI screen first appears.

The Application 212 (FIG. 2) locates the linked Child Object, PCO1-1 in FIG. 2 that is linked to the parent object PR2 in 252 that matches the highlighted button "TV" on the UI screen. It then finds the parameters for each of the buttons in the Child Object list PCO1. This list PCO1 is the sub-category that corresponds with the highlighted main-category. Again, any of the items in the sub-category can be highlighted. For TV, we chose the last TV channel played that the system remembers.

The Application then tunes to the selected channel and displays it on the screen. At the same time, the UI screen is displayed overlaid on top of the playing TV channel. This is shown in FIG. 13 and discussed later.

With the UI screen displayed, the system waits for user input to either change the channel or select a different main-category and, in an alternative embodiment, before the UI display times out. Cursor movements are tracked. At UI display time-out, the UI screen vanishes from the display screen and the user only sees the content.

In process UP2, the cursor is tracked and the Application waits for the user to select an item. With this tracking, the Application selects the parent object in the Presentation Repository, corresponding to UI main-category, or the linked Child Objects, corresponding to UI sub-category.

In step 904, if the user moves the cursor to a main-category button and presses (OK) on the remote control, that main-category button will be selected. Process UPP3 selects the PR parent object corresponding to the main-category button, and using the display properties in the PR object, highlights that button. The links in the parent PR object is used to locate the Child Objects. Using the Child Object list, sub-category buttons are then displayed in the sub-category region. As an example, if the user moves the cursor to the InternetTV button in the main-category region and presses (OK), the InternetTV button will be selected (highlighted) and the sub-category buttons (names of the countries or regions) corresponding to the InternetTV main-category will be displayed in the sub-category region.

As previously discussed, for simplicity the remote control selection choices are defined as (OK) and (Menu). An action is taken if the cursor is pointing at a UI button corresponding to a Child Object such as PCO1-1 and the OK button is pressed. If the cursor points to a UI button and the Menu button is pressed, Child Object PCOM1-1 is used to display the menu choice buttons. This is true for the main-category and the sub-category UI buttons.

If the design calls for more choices, more Child Objects-would be linked to the PR object reflecting multiple choices.

In step 904, if the user presses the (Menu) button on the remote control when the cursor is pointing at a main-category button, then process UPP4 is selected. On pressing the (Menu) button, the second Child Object list PCOM1-1 is selected. If the user moves the cursor to one of the menu commands, and presses (OK) on the remote control the Application will go to the matching Child Object, e.g. PCOM1-4, and take action corresponding to that button. Examples of main-category command buttons are: move the button up, move the button down, delete, change color, etc.

Process UPP3 and process UPP4 both exit to the beginning of process UP2 to reflect that the system is tracking the cursor to determine the next user action.

If after changing the main-category selection the cursor moves to the sub-category region, the user has similar action choices as he or she had for the main-category. The user can select an item by pressing the OK button or bring up the menu for commands by pressing the Menu button. The decision point "Sub-Category Actions" 910 in FIG. 9 illustrates these choices.

If, as determined in step 910, the user points the cursor to a sub-category item on the UI and presses the (OK) button on the remote, process UPC3 will be selected. In this process, a linked PR Child Object is used to determine if the cursor points to content (such as a URL or path) or if there are additional choices or information that needs to be displayed. If the Child Object indicates content, it starts playing. If the Child Object points to additional information or choices, then the process moves to the next decision point. The main and sub-category items are highlighted.

After process UPC3, step 920 labeled "content, listing or sub-category" reflects possibilities with content or other choices available that provides more details. If the sub-category button points to content and the user presses the Menu button on the remote control, process UPC4 will check for content and pull up command choices for display. The command choices examples are: user wants to tag this content as "favorite", user wants to record the content, delete the content, or any other command the design and features call for. One of the command buttons displayed is Play, which if clicked (by pressing OK), will cause the content to begin playing. The control then goes to process UPC5.

In process UPC5, if the user presses the Exit button on the remote control, the system 212 will remove the UI display and go back to the state where content that was being played when the user entered the UI would be displayed. If the user does not do anything, then after a time-out elapsed time, the system will go back to the content being played at the time user entered the UI. The time-out time is set up in the system 212 to provide the time UI screen stays overlaid on the content without any actions by the user.

In step 920, if the user presses the OK button on the remote control, the control goes to step 924 where the button is checked for link to content. If the button points to the content, it begins to play through process UPCC3. The control then goes to process UPC5. The actions in this process have already been described above.

In step 924, if the button does not point to content, then in this exemplary embodiment there are two possible ways additional information can be listed on the display 122. Step 928 resolves this. If the additional information is in a sub-category, control goes from step 928 to process UPCC6. This process manages level-2 subcategories. First, the process UPCC6 moves the level-1 subcategory to the main-category region 810 in FIG. 8. Next, the process locates the next level PR child object in PR Structures 250 in FIG. 2 that represent level-2 sub-category and moves them to the level-1 subcategory region 830 in FIG. 8. The control then goes to process UP2 where it tracks cursor's movement, user action or time-out. Note that the main-category region 810 has level-1 sub-category in it.

If step 928 determines that the additional information is a listing, the control goes to process UPCC5. In this process, the PR child object would indicate if the listing consists of a path to a directory or a file on a system, a URL, or some other object that has enough information that it can be displayed on the display 122. Once the listing information is located, the Application 212 fetches the listing content and displays it in region 820 of FIG. 8. The listings can be nested; meaning an item in one set of listing may in turn point to another listing. In such scenario and in one embodiment, the main-category 810 and sub-category in 830 in FIG. 8 remains on the screen while the listing keeps changing. At some point, when the listing points to the content and the user clicks it, the content begins to play. The control then goes to process UPC5. It is easy to see that linking Child Objects to a PR parent object where the Child Object also contains UI display properties, one can create various combinations of main-category, sub-categories, and listings. The same techniques can also be used to create many other UI displays with various combinations of regions, buttons, menu options and UI navigation.

If, in step 910, the user points the cursor to a sub-category item and presses the (Menu) button on the remote control, the Child Object linked to the sub-category item and corresponding to the Menu button will be selected. This Child Object is similar to PCOM1-1, PCOM1-2 described above for selecting menu choices in the main-category. The control goes to the process UPCC4.

The process UPCC4 uses the Child Object list to present the "Menu" button choices that corresponds to this sub-category item. As an example, if the sub-category item is a TV show, and the user has pressed the Menu button, menu button choices will be displayed that may show, buttons such as: "Add to Favorite", "Delete from Favorite", Record, or "Back" as the menu button choices. These choices correlate with one Child Object each, with a particular button represented by a Child Object PCOMx-y where x and y represent the x'th item in the sub-category and y'th command in the menu choices. Track the cursor and wait for the user to point to one of the command and click OK. When the user selects the command, the Child Object corresponding with the command will be selected. This Child Object provides the path to the process in Application 212 that can carry out this command. Following the execution of the command, the control goes to process UP2 where it waits for the next action by the user.

It is possible that sub-category item commands may not execute everything needed with just one menu command because more selections are available and other choices can be made. The PR Child Object structure for the sub-category and the next level linked Child Objects PCOM2-1, PCOM2-2, . . . provides the mechanism through which second level menu buttons might be presented. In one embodiment, the menu options may appear on the screen one on top of the other, with the newest one fully visible, to provide a mechanism to the user to remember the content on which the action is being performed through main and sub categories and to walk back using the "Back" button.

Figure 10:
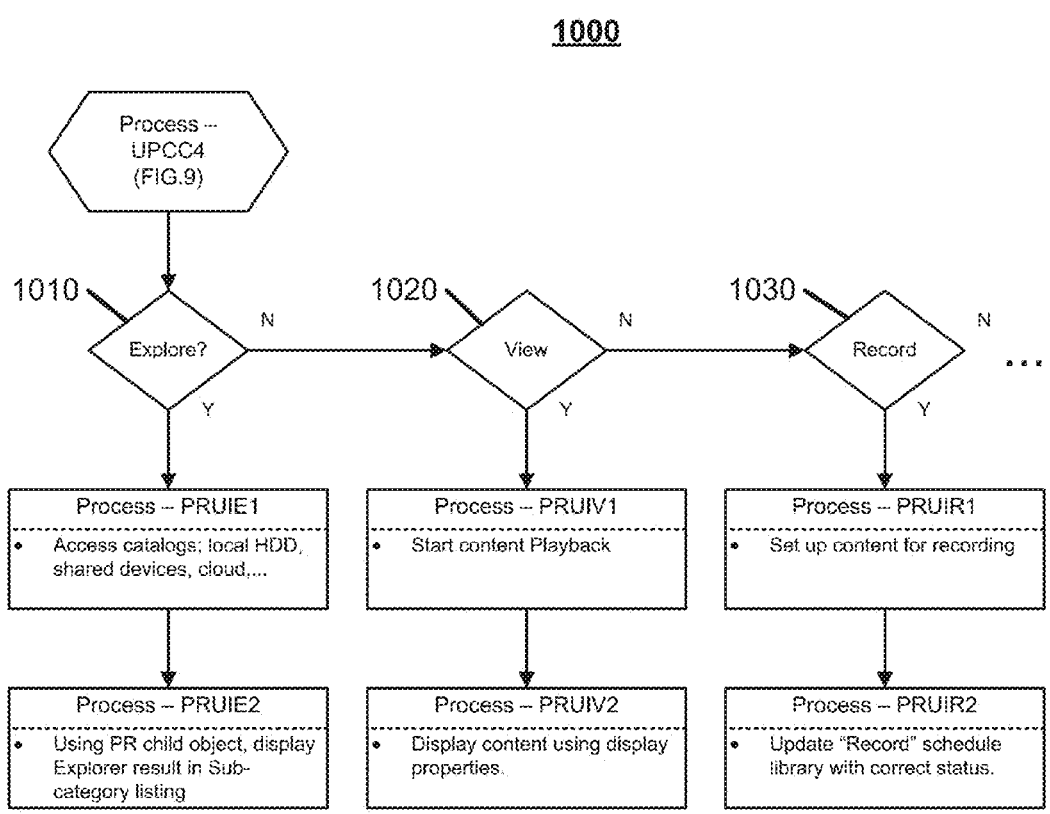
FIG. 10 is a simplified flowchart illustrating use of Menu button options in the user interface.

FIG. 10 is an exemplary flowchart illustrating, in one embodiment, the menu buttons and the actions performed by the system 100 in the process UPCC4 in FIG. 9. The flow 1000 begins with process UPCC4 where the user is presented with, in this embodiment, three choice buttons by pressing the Menu button on the remote control at step 910.

For illustrative purposes, the menu choices include an "Explore" button, a View button, and a Record button. As previously stated, other buttons, such as Add to Favorites, Back, etc. might be provided.

The "Explore" button is similar to the command in various operating systems that lists libraries, directories, and files. Step 1010 shows tracking of the remote control pointer and whether the user clicked on it while it was pointing at the Explore button in the menu. If the button was clicked, the control goes to process PRUIE1. This process enables the system 100 to access the storage 106, and storage on other user owned networked devices and the cloud through the network port 102. The Explore Child Object process PRUIE1 extracts the pointers to the catalog system 100 maintains on storage 106 for content locally stored. Similarly, using the path information to other networked devices, it accesses the catalogs maintained on those devices. Next, process PRUIE2 compiles the list of all contents list accessed from the catalogs and presents it to the user in the listing area 720 in FIG. 7. The exit from process PRUIE2 is back to process UP2 in FIG. 9 where the system 100 waits for the next action by the user.

Similar to the Explore button, if the user points to the View button on the menu and clicks it, step 1020 will pass the control to process PRUIV1. In this process, the content pointed to by the child object is played. Process PRUIV2 causes this content to be displayed on monitor 122. The exit from this process is back to process UP2 in FIG. 9 where the system 100 waits for the next action by the user.

Lastly, FIG. 10 shows the Record button that, if pointed to and clicked by the user, goes through step 1030 to process PRUIR1. In this process, the system initiates the process to begin recording the content on the storage 106. Generally, a record function also provides options for, for example, beginning recording immediately or at a set time. Optionally, the recording can be aligned with the electronic programming guide (EPG) to record a specific program at a given time. All such choices for selection and input can be presented through more menu buttons using level down linked Child Objects. When the recording is set up, process PRUIR2 sets the system 106 recording schedule library by modifying it. Recording Schedule Library is a list of all content or programs that are scheduled to be recorded by the system 100 at the "recording begin time". Such library is also useful to enforce recording rules that may include limits on the number of tuners that can receive the programs for multiple program recording, digital rights management, recording conflict, no space available, etc. The exit from this process is back to process UP2 in FIG. 9 where the system 100 waits for the next action by the user.

Presentation Repository Update Flow

Presentation Repository update is performed to reflect new changes in the Attribute Repository Structures 220 that results from system 100 learning new user characteristics, or new information on content, products, advertisements or services. The scope of machine learning executed by the system 100 is aligned with the product usage classification. In one implementation, the product is used for entertainment, commerce, social media, and advertisements. Based on the product usage, the Attribute Repository Structures 220 include user characteristics and information on movies, clothing, transportation, food, music, TV shows, videos, people, places, etc. in the parent and child AR objects. Benefits to the user, service providers, merchant that offer products or services and the advertisers can only be realized if the things the system has learned (machine learning) can be displayed to the user automatically. This is done through the Presentation Repository.

The User Interface main-category choices can be aligned with the product usage classification. The UI screen presentation and layout might have requirements from the service provider, such as subscription choices and content or product promotion priorities. An example of subscription choices is "limited content accessibility" provided by the service provider that cannot be changed by the user. Such limits are provided to, for example, protect children if the distributed content might include mature or adult material. Content or product promotion priorities might be employed when the service provider requires that content through their distribution channel or products from their preferred merchants are displayed first. In one example, the UI main-category items for the first product usage classifications are TV, InternetTV, Music, Radio, Movies, Shows, Videos, Shopping, Social Media, Search, and so on. These items can be prioritized or restricted, based on the requirements or business criteria mentioned above.

The processes described up to this point show how the Attribute Repositories Structures 220 and the Presentation Repository Structures 250 in FIG. 2 are created and used in the system 100. When the user is viewing content, changes in the AR Structures 220 can occur as fast as system can learn. At the same time, PR Structures 250 needs to reflect the changes in the AR objects as quickly as possible to show the latest updates. If the system 100 has significant computing power, this can be done with ease. In the embodiment where the computing power is more limited, the update is done when the computing requirements are low such as when the device is not in use.

The flow uses tags, called UI category item tags that are saved in the Attribute Repository objects and were created as previously described in the Learn Mode. The Seed 224 keyword that created the Attribute Repository object also has a parameter indicating if the AR object would be part of the main-category, sub-category, or no category in the UI. This UI category tag is saved in the AR object. When the system links the AR objects, the linking forms the chain that would contain an AR object with main-category tag and other AR objects with sub-category tags. The chains in the Attribute Repository describe the relationships user characteristics have to the product or services. The UI category tags describe the relationship AR objects have in the UI with respect to each other. It is not necessary that the UI relationship in the AR chain be exact. The PR update flow can sort the AR objects and can create PR linking to reflect the accurate relationship of these AR objects in the UI. As an example, if an AR object is created with a "Movie" UI main-category tag, AR object in the chain with keyword "Movie Title" will have a sub-category tag. Other AR objects in this chain or other chains matching the user characteristics will not be made part of the UI main-category Movies. If the system is configured to learn new UI main-category items, then these main-categories are also added to the Seed so that association can be made between the new AR objects and the new PR objects.

Figure 11:
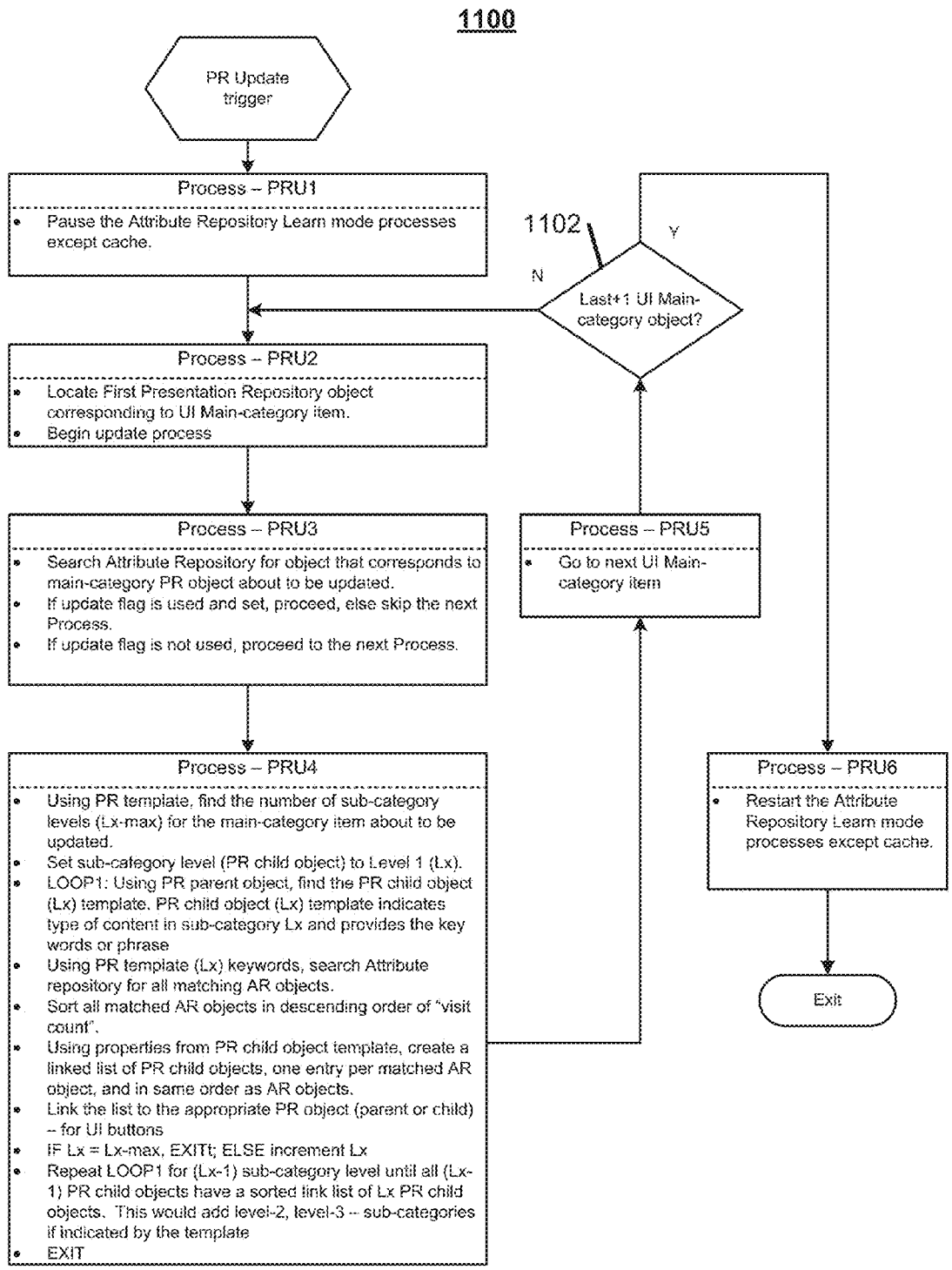
FIG. 11 is a simplified flowchart of a Presentation Repository update process.

An exemplary Presentation Repository update flow 1100 is shown in FIG. 11. A Presentation Repository update trigger, which is a timed process that triggers the Presentation Repository update process, is used to start the update. Process PRU1 stops all Learn-Mode activities for the Attribute Repository 222 and the Child Objects. By stopping the Learn-Mode activities the possibility of the PR update process continuously chasing the AR Learn process is eliminated. The caching activity continues per process AR3 in FIG. 3 to capture user activity, if any, during this time.

In process PRU2 the first Presentation Repository object that corresponds to a UI main-category is located and the PR updating is begun. The first UI main-category item is the one that appears highlighted when the UI first appears on the screen, for example, TV.

In process PRU3 Attribute Repository structures 220 is queried to find any AR object that contains the UI main-category tag and is the one about to be updated in the Presentation Repository. In one embodiment, an "updated" flag is added to the updated AR object. If the AR object's updated flag is set, it means that new AR objects were added and this main-category item needs to be updated. If the flag is not set, the system can skip this update. If the AR object reflects an update, corresponding PR objects and the links (i.e. the Child Objects) will be updated.

Then process PRU4 begins the update process. Earlier it was discussed that a Presentation Repository parent object represents a UI main-category item. The PR parent object is linked to PR Child Objects that represent UI sub-categories. A PR Child Object is linked to the next lower level Child Object that represents a UI list (FIG. 2, FIG. 7 and FIG. 8). Thus, the UI display chain consists of (in order): UI main-category item→UI sub-categories display→UI list.

With the match, an Attribute Repository object has been located that matches with the UI main-category item and the Presentation Repository parent object. Referring to FIG. 2, the PR Template 256 in Presentation Repository Structures 250 defines what can be linked to the PR parent object and the properties such items may possess, such as the type of content in the UI sub-category. The content type could be a title, such as title of the movie in the UI main-category of Movies, or a country in the UI main-category of InternetTV.

In one exemplary embodiment, the PR update process in process PRU4 is setup to meet three objectives. (1) The information needs to be presented to the user per the UI guidelines and aesthetics. (2) The UI presentation needs to be dynamic in nature to reflect user tastes and preferences that may have changed—this means items can be added, deleted or presented in different order. And (3), each UI item must have fast access to other information system has learned about the user so that at this instant in time when the user is watching something that interests him or her, other related user interest centric information can be used to predict and offer content, merchandise or advertisement type of information for greater effectiveness and most benefit to the user.

The update process for each UI main-category item is iterative in nature. The number of iterations is based on the number of sub-categories or levels illustrated in the PR template. If a PR template for a main-category, such as movies, shows one Child Object with keyword as "movie title", then the sub-category level is one and only titles will be listed in the buttons in the sub-category region of FIG. 7. Alternately, if the PR template illustrates two PR Child Objects linked to the main-category of movies, then there will be two levels of sub-categories. The first PR Child Object in the template with the keywords "movie genre" would indicate that level-1 sub-category 730 in FIG. 7 has buttons that provide the genre for the main-category of movies. The second PR Child Object in the template with the keywords "movie title" would indicate that if any of the movie genre buttons was clicked on the UI screen; the level-1 sub-category would move to the main-category region 810 in FIG. 8 and a second level sub-category would appear in the region 830 with buttons where each button is a movie title available within that genre. An exemplary showing of buttons in the main and sub-category is shown in FIG. 13 and is discussed in more detail below.

The process PRU4 first determines the number of sub-category levels from the PR template matching the Attribute Repository object identified in process PRU3. Let us assume this umber is Lx-max. Next, a loop is setup that will update various sub-categories up to Lx-max level as described below.

The loop begins by searching for all Attribute Repository objects that match the keywords or phrase in the PR Template Child Object for Level-1. As an example, the Level-1 PR template for main-category of movies would provide keywords such as "movie title", if movie titles only were to be included in the Level-1 sub-category. Alternately, the keywords would be "movie genre", if movie genre was to be included in the Level-1 sub-category. Any AR object found with such keywords would provide the necessary information or pointers to be included in the UI buttons.

Next, we locate the "visit count" for each matching AR object. It was discussed earlier in the document that AR object visit count is incremented by one anytime the AR object is included in a chain for searching information to be presented to the user. Also recall that the chain is created following forward and backward links in AR objects and is a mechanism for matching a user characteristic with a content, product, brand name, or advertisement. If a matched AR object is linked to many chains, it would have a high visit count. A high visit count implies that this AR object either directly effects the linking of the user characteristics with information about product and services or is a significant contributor to it. Such an AR object would be a great predictor for related content, product, and services and would imply much more than simply labeling this content as favorite. The visit count is used to sort the matched AR objects in a descending order of the visit count. The first UI button displayed to the user is based on the highest visit count AR object and would reflect the "most beneficial" entry to the user.

Next, we create a linked list of PR Child Objects in the Presentation Repository. These Child Objects are linked to the PR parent object representing the UI main-category. Each entry in the link list is created in the same order as the AR object sorted list. Each entry uses the PR Template 256 to fill in the properties, links, navigation choices, and other essentials from the AR object for the display button in the UI. Note that the Child Objects would include objects such as PCO1-1, PCO2-1 as shown in PR Structures 250 in FIG. 2 and synonymous with the action of user clicking the OK button on the remote control. A second Child Object list would also be linked, consistent with the Child Object list for Menu button options as described before. Thus, for each PCO1-1 Child Object that will be followed when the user presses the OK button on the remote control, PCOM1-1 Child Object (not shown) is provided that will be followed when the user presses the Menu button on the remote control. Once the PR Child Objects are all linked, the system would have completed creating the sub-category level that started with the loop.

The next step in process PRU4 is to increment the sub-category level and check it against the maximum number of levels in the PR template. If the PR Template indicates that there are more levels, the system repeats the loop; this time for each PR Child Object in the Level-1 sub-category, until all Level-1 PR Child Objects have received the Level-2 sub-category linked and sorted PR Child Objects. In other words, Level-1 subcategory buttons in the UI would receive the UI menu choices and navigation buttons for Level-2. The process repeats itself until there are no more levels left in the UI sub-categories and the max sub-category level has been reached.

It is possible that the information available at some level of UI sub-category is such that it cannot be easily put in buttons. In such event, a list can be compiled that can be displayed in the listing area of FIG. 7 or FIG. 8. Such lists are created from chains after matched AR objects are found. In one embodiment, the list can have headings for readability or to show association with the sub-category buttons on the screen. Under each heading, information extracted from the chain with matched AR object is inserted. At the end of this process, the list comprises of all the information that matches the user's interests and is related to the one item in the UI sub-category. Once the listing is complete as a file, the pointer to the file will be added in the Presentation Repository Child Object for the sub-category. When the user clicks the sub-category button on the UI, the listing area of the UI display will then show the content of the file.

After all new and updated Attribute Repository objects are processed for one UI main-category, the Application goes to the next UI main-category item in process PRU5. If, as determined in step 1102, this is not the end of the UI main-category item list, process PRU2 is entered where the process of updating the UI sub-category and list is repeated again for the new UI main-category item.

Once all the UI main-category items are processed, the Application 212 executes process PRU6 that restarts the Attribute Repository update activity that was paused at the beginning of this process. The Application then terminates with this flow.

User Interface

The User Interface (UI) is the graphics and fonts that are displayed on the-screen overlaid on top of the currently playing content or a blank screen.

The graphics include buttons, navigation options, layout, color, fonts, etc. that can be shown on the screen. As discussed earlier, objects in Presentation Repository drive each element of the UI. The presentation repository object describes how a particular entity of the UI, such as button, menu, or listing is displayed on the screen. Display properties in the PR object describe the appearance. This includes the item location on the screen, border, color, font, embedded picture or video, etc.

A Presentation Repository object can also indicate that the content is to be displayed in full screen or a window. A window is beneficial if for example, a user is watching a show while simultaneously interacting with the show site, a social site or simply with friends over Instant Messaging. In this case, both windows will be shown. In one embodiment, the UI overlaid is scaled to full screen.

FIG. 12 shows an exemplary flow of UI actions, various processes in Application 212, and menu operations to create a new user. The system 100 learns about a user characteristics and matches them to content, products, services, advertisements, etc. that are needed for system usage classification. Since the information learned by the system 100 about the user is deep and might be highly personal, other possible users will need to have their own set of data in the Attribute Repository Structures 220 and the Presentation Repository Structures 250 in FIG. 2. FIG. 12 illustrates these Structures collectively for three users as 1220, and specifically as Structure set 1220-1 for the user Family, Structure set 1220-2 for the user User 2, and Structure set 1220-3 for the user User 3. A product such as a STB or a gateway with sufficient storage 106 could maintain structures 1220. Other products owned by the user that are not used by others, such as a mobile phone, will only need to have one set of structures 220 and 250. As discussed earlier, in one embodiment where other user owned devices like the mobile phone that have limited storage 106, have a limited number of AR objects in AR structure 220 and PR objects in PR structure 250 to conserve storage space. A method discussed later provides the process through which a mobile phone like device can "synchronize" with a STB or a gateway type device to maintain most up to date objects in structures 220 and 250.

FIG. 12 flow 1200 begins with step 1210 when the user turns on the TV. In one embodiment, Application 212 begins the process Startup where the system 100 defaults to a user profile named "Family". This profile contains AR objects in structure 220 that the system 100 learned from the user named Family, by accessing entertainment content or web pages that the "Family" was careful about in selecting. The structures used are shown in 1220 as the set 1220-1. In another embodiment, the profile for Family can be restricted by the service provider to have a "limited accessibility content" profile as a default profile as described earlier. Next, the process Startup selects the initial program to display. For TV usage classification, the program is typically selected from the last channel the user had tuned through the tuner 112. After selecting the content, process Startup initializes the processes and locates the parent PR object matching the TV main-category. Using the Child Objects linked to the parent PR object, process Startup prepares the content for display and prepares the UI that will be overlaid on it. In step 1214, the content prepared for display (last TV channel) is displayed on the screen 122. The UI is overlaid on top of the content.

From step 1214, the control takes two paths. One to process Multiple, the other to Process Menu. In process Multiple, the processes discussed in FIG. 3, FIG. 4, FIG. 5, FIG. 6, FIG. 9, FIG. 10, and FIG. 11 are invoked. As a result, Attribute Repository Structures 220 and Presentation Repository Structures 250, shown as Structure set 1220-1 in FIG. 12, are updated as the system learns about the user characteristics and links them to content, products, advertisements, and services that interest him or her. The system stays in this loop changing display on screen 122 as the processes indicate and updating structures 1220-1.

In process Menu, the UI is overlaid on content if the process Menu was entered from step 1214 before the UI timed out. If the UI timed out, pressing the Menu button on the remote control will overlay the UI on the content being played. Next, the control goes to process Change User. The user points the remote control to the main-category region 710 in FIG. 7 and presses the up/down buttons on the remote causing the main-category items to scroll. All remote controls have the up/down or left/right function implemented with buttons showing direction of the movement with arrows, track ball, scroll pad, or other such technology. When the Settings main-category is visible on the screen, the user points the cursor to that button and presses the OK button on the remote control. The user has selected the Settings. The button will be highlighted. Using the PR Child Objects linked to this main-category, the system 100 will display the sub-category in region 730 in FIG. 7. The user will point the cursor to the sub-category region and scroll left or right using the remote control until the User button is visible. Pointing the cursor on the User button in the sub-category and clicking on it will cause the level-1 sub-category to shift up to region 810 in FIG. 8 and a level-2 sub-category will appear in region 830 in FIG. 2. The level-2 sub-category would display buttons that shows the name of the users, one per button, who have a profile on the system 100. In step 1216, the user sees if his or her name is in the level-2 sub-category by scrolling it left or right. If the user name is present, the user will point to it and click. The control will then go to the process Switch User. In this process, the user will be asked to enter a passcode (if one exist), and after it is entered, the system will save current objects, for user Family, in the Structures 220 and 250 in Structure set 1220-1 and then go to process User Selection. In this process, the system 100 switches to the new user, e.g., User 3, brings up the new AR and PR structures 220 and 250, shown as Structure set 1220-3 in FIG. 12, and then goes to the process Startup. If in step 1216, the user does not see his or her name and wishes to create a new user, he points the cursor to New User button and clicks on it. Then in process Create User, a series of menus appear where the user is asked to enter the necessary information, such as name, passcode, etc. As an example, he is assigned a name User 2. The settings for User 2 are saved. Next, the control goes to process User Setup where the default parameters, consisting of default AR and PR structures 220, and 250, respectively, are set up for User 2 in set 1220-2 in FIG. 12. Application 212 is linked to these structures. The control then goes to the Process Startup.

FIG. 13 show a UI Screen of FIG. 7 overlaid on a TV show 1310. The background shows the content currently playing highlighted by the main-category button 1360 (TV), and the sub-category button 1380 (TV Channel1). The foreground shows the UI items. Collectively, the image 1300 is the first screen of the UI in one exemplary embodiment.

Items in the UI can be selected by any of the means that currently exist or are being developed. These include remote control devices with interfaces such as infrared (IR), Bluetooth, or other wireless link, smart phones, tablets or other mobile devices running remote control applications, keyboards, mouse, voice control, and motion or gesture recognition.

Action on a UI item is by moving the cursor to the item and then clicking or pressing the OK button to execute the content, such as playback, or pressing the Menu button to bring up the navigation and other command choices.

The UI components as seen in FIG. 13 and how they relate to the processes are discussed. Other layouts of the UI display are practical and expected.

1340: Logo: Displays the service provider, manufacturer or customer's logo.

1330: Time and Date.

1320: UserName: The name of the current user whose profile is being used at that time. Profile implies the Attribute Repository and Presentation Repository structures as shown in FIG. 2. The UserName may consist of Family for a group of people, or individuals such as Mom, Dad, Joe, Sue, etc. Each one of these users will have their own AR and PR structures and libraries containing content.

As discussed above, each profile can be accessed through a password, if one exists, or other means such as face or fingerprint recognition that may become available in the future.

1360: Main Category Carousel—MCC (Music, Movies, InternetTV, TV, Radio, etc.): The carousel shows buttons that are represented by PR parent object. The main-category can be static and fixed by the service provider to limit the features of its offering. It can also be dynamic where new items can be added by the user. In the latter case, a new Presentation Repository parent object will be added to the list. The carousel effect is provided by a separate application and is well known in the art. An example is the Radio button 1350 appearing smaller than the current highlighted button TV, 1360. The carousel can be rotated up or down to reveal more entries.

1370: Sub-Category Carousel—SCC (TV channels, etc.): The Sub-Category Carousel is to the right of the highlighted main carousel item (in this example the item labeled TV is the item highlighted in the MCC). The number of elements in the SCC depends on the item highlighted in the MCC. Some MCC items have fewer SCC entries and others have a large number of SCC entries.

1380: TV Channel 1—A selection button in the sub-categories for the main-category 1360 (TV). The button is bigger and brighter than other TV Channel buttons; meaning highlighted, and indicates that this channel is providing the content 1310 that is on the screen.

Advertisements

Advertisement is the primary source of revenue that drives the businesses of television and Internet. Content providers such as TV show producers, movie studios, music producers, video distributors, and search engine providers, web portals, etc. derive all or a significant part of the revenue from advertisements.

The system 100 with Attribute Repository Structures 220 and Presentation Repository Structures 250, FIG. 2, has been described above as having the ability to create knowledge of the users and that knowledge is linked to the information about content, products, advertisements, and services that are of interest to the user. This ability enables the system 100 to display advertisements, promotions, merchants with deals, etc. of interest to the user at a time when he or she is most likely to remember, follow up, or close a transaction. The precise and targeted placement of information before the user might be highly valued by advertisers and might command a premium.

The primary form of advertisement in TV and through the Internet is through advertising campaigns. Advertising campaigns are when a content provider or an Internet service provider forms a business deal with a product or a service provider to promote their offerings through advertisements during a specific content and a specified period of time. The specific content could be a show or a movie that is rated high and so is expected to have a larger audience. Advertisements on such shows command a higher price. Specified time would be a show run during prime time (e.g., 8 PM to 11 PM) when the potential number of viewers is usually the greatest, versus the show run very early in the morning when it is expected to have much fewer viewers.

Vendors have been developing methods to make the advertisements more effective by trying to figure out how to "target" these advertisements towards the audience so that they can command a premium from the content carriers (e.g., TV broadcasters).

There are issues with current advertisement and targeting methods that the system 100 addresses. The advertisements broadcasted through the TV programs are intrusive and not targeted at all, and the one sent through the Internet are based on knowledge about the user one vendor has assembled from a distance through tracking, history or other means. These advertisements are also intrusive and are coarsely targeted, if at all targeted. In addition, current systems do not have a good way to accurately measure the effectiveness of advertisements over time. Effectiveness means that the viewer took action on the advertisement by following it to see the product, such as going to a showroom to see an advertised car, or close the transaction, such as buying the car. Companies such as Nielsen, AdWorks, and others have developed techniques and technology (e.g. click count) in ad analytics which enables them to measure some ad effectiveness. But click count is not following the advertisement or closing the transaction as described above. Ad effectiveness is the metric used by the product manufacturer or service provider to pay the ad carriers. Ad carriers include content producers and content deliverers.

The system 100 and the algorithms described do not change the current advertising methods, should a vendor choose to deploy them, but provides a new model of "pulling the specific advertisement and related information" and presenting it to the user at the "right" time for a much greater effectiveness. This new model might affect the way ad carriers, such as telephone, cable and satellite service providers, do business with the content, product or service promoters, such as studios, show producers, product manufacturers, etc. and allow the ad carriers to command a premium from advertisers whose advertisements are more effective and proposing greater effectiveness strategies to those whose campaign-based advertisements are not producing the desired results.

Referring to FIG. 4 and process S4, details of which are provided in FIG. 6, in one embodiment the system 100 has identified AR object chains that link user characteristics with information about content, products, advertisements or services. After determining if the content being played is live in step 450, the control proceeds to process D2. This process detects beginning of a campaign based ad that is sent by the provider and the user is "forced' to watch. In process D3, the system 100 locates the chains identified in process S4 and based on the weights computed in process S5, accesses the product or service search result compiled in process S5. The highest ranked search result and the highest weighted chain is the one which the system has identified as the one the user has most interest in at this time. Using this chain of AR objects, the system locates the lowest level Child Object that has product information and/or link to the manufacturer website. The system 100 then locates the advertisement in the search results in process S5 and after accessing, begins playing it.

If the content is not live, the control then goes to process D5 where the system 100 locates the advertisement similar to the way described above for live content. The key difference between the two is that live content is played full screen or in the window by the system inserting the ad in place of the live stream. For Internet streaming content or web pages that are not being played full screen, the areas around the main content has banner, stationery, or cursor sensitive advertisements. The system can intercept and populate these areas of the screen with advertisements it has located through the AR objects in the AR structure 220 as the ones the user has interest in at this time.

The Attribute repository Structures 220 in FIG. 2 also shows Attribute Filter 234. As previously stated, Attribute Filter 234 are used to communicate specific information, defined by the object in the filter, such as AF-4, through the flow link 208 and network port 102 in FIG. 1 to the service provider or the vendor. Thus, for each advertisement shown to the user, the system 100 can accurately communicate what product or service was promoted. Since the system also manages other AR objects in the chain based on user activity, AR objects associated with any activity that the user conducted for the promoted product would be in the AR object chain. Thus, if a product or a service promoted to the user resulted in the user making a purchase on line, the system 100 would know details of the merchant and the sale. Similarly, if the user visited sites or did "more research" by visiting manufacturer or product web sites, the system 100 would know that the user actively followed up on the promotion. This kind of information can also be sent to the service provider or the vendor and would be a very accurate metric on the effectiveness of the promotion.

Operation with Other Devices

The system 100 in FIG. 1 resides in a STB or a gateway that has large storage 106 and sufficient computing power. A STB or a gateway typically is supported through a high speed Internet connection and a TV service provided by a service provider (cable, telephone, or a satellite service) through a broadband network 102. The system 100 can also run on a mobile phone owned by the user where generally, the wireless broadband 102 either does not have speeds comparable to cable or fiber broadband and/or the cost of data service is very high.

The user can benefit from system 100 in the STB or the gateway as well as when the system 100 is in a mobile device. The benefit in the mobile device is that the system 100 output to the screen 122 can provide the user with information that matches his or her characteristics. This information is associated with content, products, advertisements, and services and, possibly, location information, that the user can use.

Figure 14:
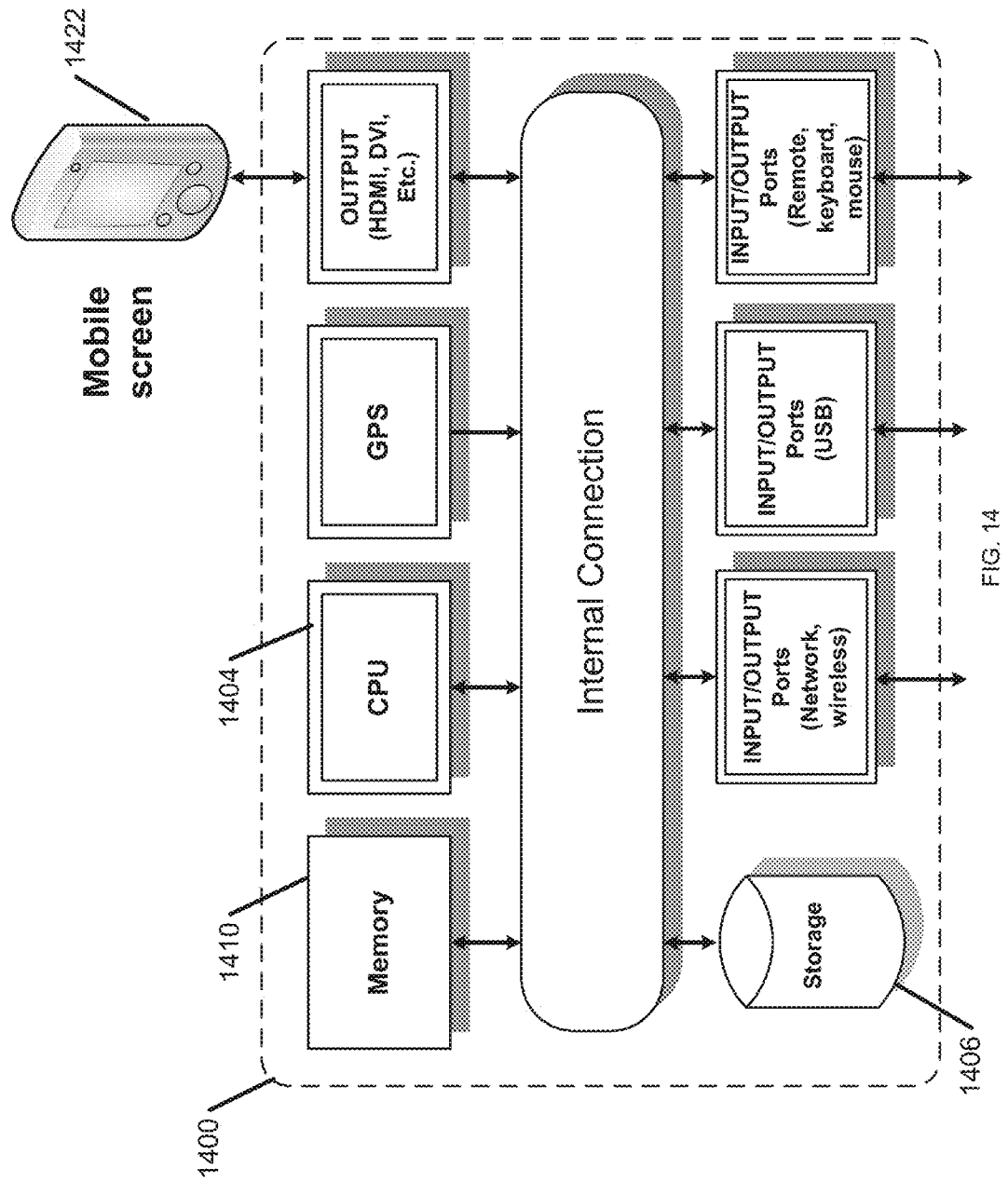
FIG. 14 is a block diagram of a mobile device for operating in accordance with exemplary embodiments of the invention.
Figure 15:
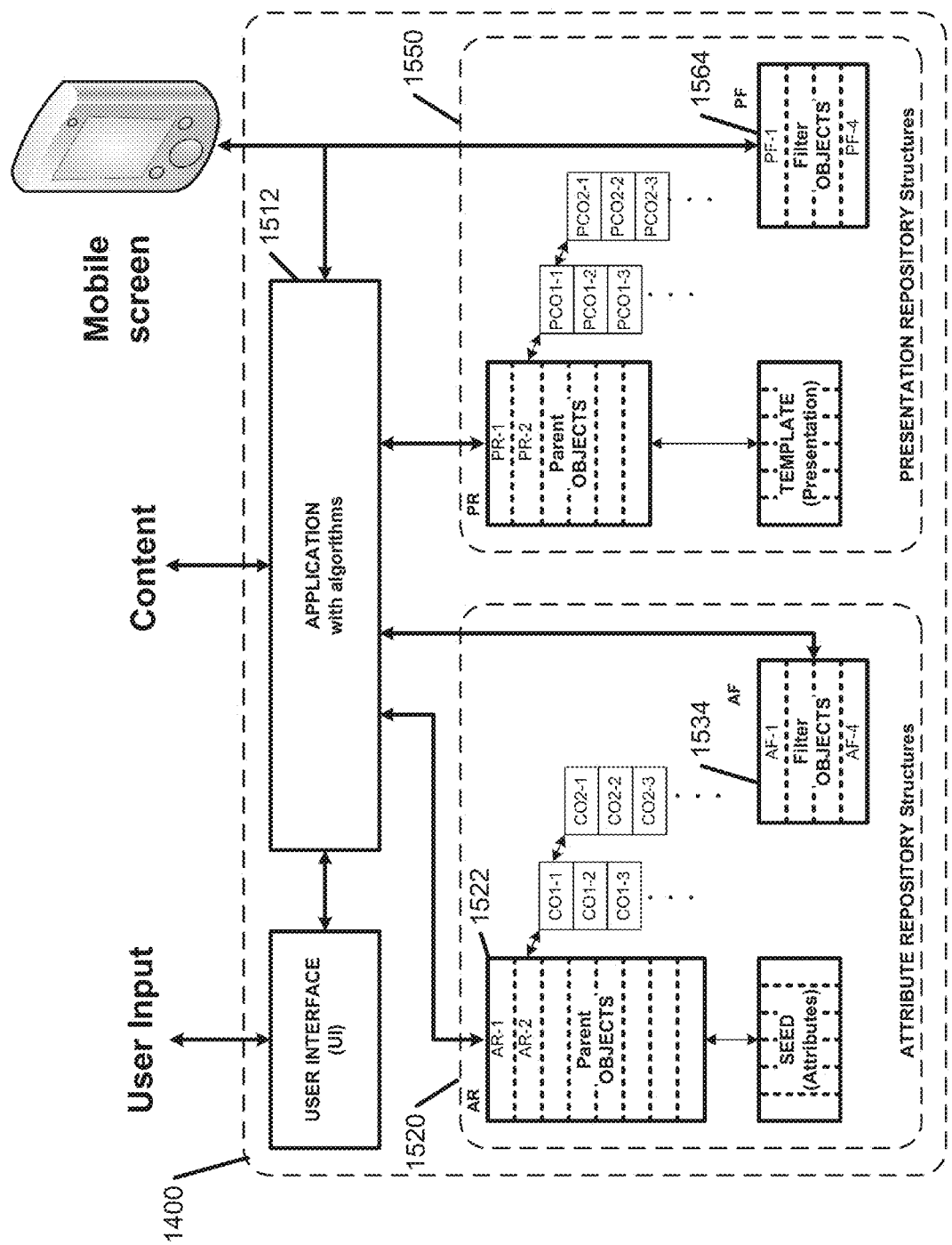
FIG. 15 is a functional block diagram of the system of FIG. 14 (mobile device) according to at least one exemplary embodiment of the invention.

An exemplary mobile device 1400 and 1500 is shown in FIG. 14 and FIG. 15 having essentially all the same components of the system shown in FIG. 1 and FIG. 2, respectively. However, mobile devices typically have a less powerful CPU 1404, smaller memory 1410, and smaller storage 1406 compared to system 100 in FIG. 1. Other components shown in FIG. 14 are tailored to the networks, such as a radio for communicating with an access point or other service provider (not shown), and other devices mobile device 1400 supports. The monitor 1422 is typically a touch screen. In addition, the mobile device 1400 is much more sensitive to power consumption.

In FIG. 15, the one possible difference between system 100 (hereinafter also referred to as an STB to differentiate it from a mobile device) and the mobile device 1400 is in the Attribute Repository Structures 1520 and in the Presentation Repository Structures 1550. The PR Structures 1550 in the mobile device would be different if, (1) in one embodiment, the Application 1512 uses the UI that comes with the mobile device, (2) the UI has different main-categories, such as a Location button, which the STB does not, and (3) the UI in the STB and the mobile device is the same except that the selection choices in sub-categories is reduced to conserve storage space. In all cases, the Presentation Filter 1564 in mobile device 1400 would define how the display should match the mobile device touch screen 1422.

In mobile device 1400, the AR Structures 1520 would have much fewer objects in the database compared to a STB because of the small size of storage 1406. It is also possible that many parent AR objects 1522 and the linked Child Objects (CO1-1, CO2-1) could exist on both the STB and the mobile device. The existence of an AR object in the STB and the mobile device indicates that the user characteristic, information on content, product, advertisements or services, identified by this specific AR object, is useful to both the STB and the mobile device. It is also possible that the STB could have many more AR objects in its AR Structure 220, whereas mobile device 1400 could have other AR objects in its AR Structures 1520 that the STB would not have. An example of different AR objects in mobile device 1400 would be places (locations) and things associated with those places.

The algorithms in FIG. 3, FIG. 4, FIG. 5, and FIG. 6 discussed how the system 100 forms the AR object chains and how they are weighted to identify the user characteristic and the information on product and services that most interest the user. In the mobile device 1400, the Application 1512 runs independently and forms its own AR object chains to better match the user characteristics with the information it has learned. Thus, if the AR structures 1520 have AR objects associated with the location, following process S4 in FIG. 5, the Application 1512 will form its own weighted chain that will match the user characteristics with location and the product and services the user has interest in. The only thing remaining to do is to synchronize AR objects in the mobile device with the AR objects in the STB so that the STB can learn new things about the location and what the user had interest in. If the STB is the hub device of the user domain, it may want to use the AR objects the mobile device has created but would not have a need to update it. Extending this concept further, if there are other user owned devices such as PC, tablets, and other mobile phones, they all need to be synchronized with the AR objects they share with the hub (STB) device. Note that the simplest example of shared AR object would be the Parent AR object 222 in the STB and 1522 in the mobile device, as they describe the user characteristics and the user is the same on all the devices.

In order to perform synchronization, the first step is for all devices to recognize each other and be aware that they belong to the same owner regardless of the means through which they communicate with each other. The means could be a USB connection, a TCP/UDP network connection, public wired and wireless networks, and so on. Mechanisms exist to identify devices using universal plug and play (uPnP), DLNA, and others including many proprietary methods.

It was previously stated that all external communication from a hub device with system 100 is managed through the Attribute Filter 234 in FIG. 2. Communication to service provider, advertisers, and merchants is controlled by the Attribute Filter 234 as described earlier. In the same manner, communication with other devices on private and public network and owned by the user is also controlled through the Attribute Filter 234. The Attribute Filter 234 contains device objects, AF-1, AF-2, etc. Some of these objects are reserved to identify all the devices that are owned by the user and in communication on the network, also referred to herein as the user's domain, such as the mobile device 1400. There is typically one device object per device. Contained within the Attribute Filter for a device, such as AF-4, are states that describe rules of communication with other devices in the user's domain. To understand the method better, the addressing and identification of devices uses a designation of the type: HomeDomain.devicetype.ID; where HomeDomain might be the unique name of the owner account which could be provided by the service provider; devicetype might be the name and model of the device such as iPhone V, iPad 2, Lenovo T61P PC, Sony PS3, etc. and provides the device's characteristics (CPU, memory, storage); and ID might be a unique ID to identify an individual device.

When a new mobile or satellite device needs to be added to the user's domain, with STB or the gateway as the hub device, the Application 212 (FIG. 2) and the default structures, or a subset thereof, are installed on the newly added device as new application software to register the new device with the hub 100. In the mobile device 1400, this would be Application 1512 and the structures 1520 and 1550. Included in the structures is the Attribute Filter 1534 that includes the reference to the Attribute Filter object, as an example, AF-4, providing addressing and protocol information for the hub device 100.

The newly added device is then capable of issuing and responding to commands from the hub device 100 (here the STB or the gateway) provided the hub device state stored in Attribute Filter, e.g. AF-4, in the mobile device allows it.

Figure 16:
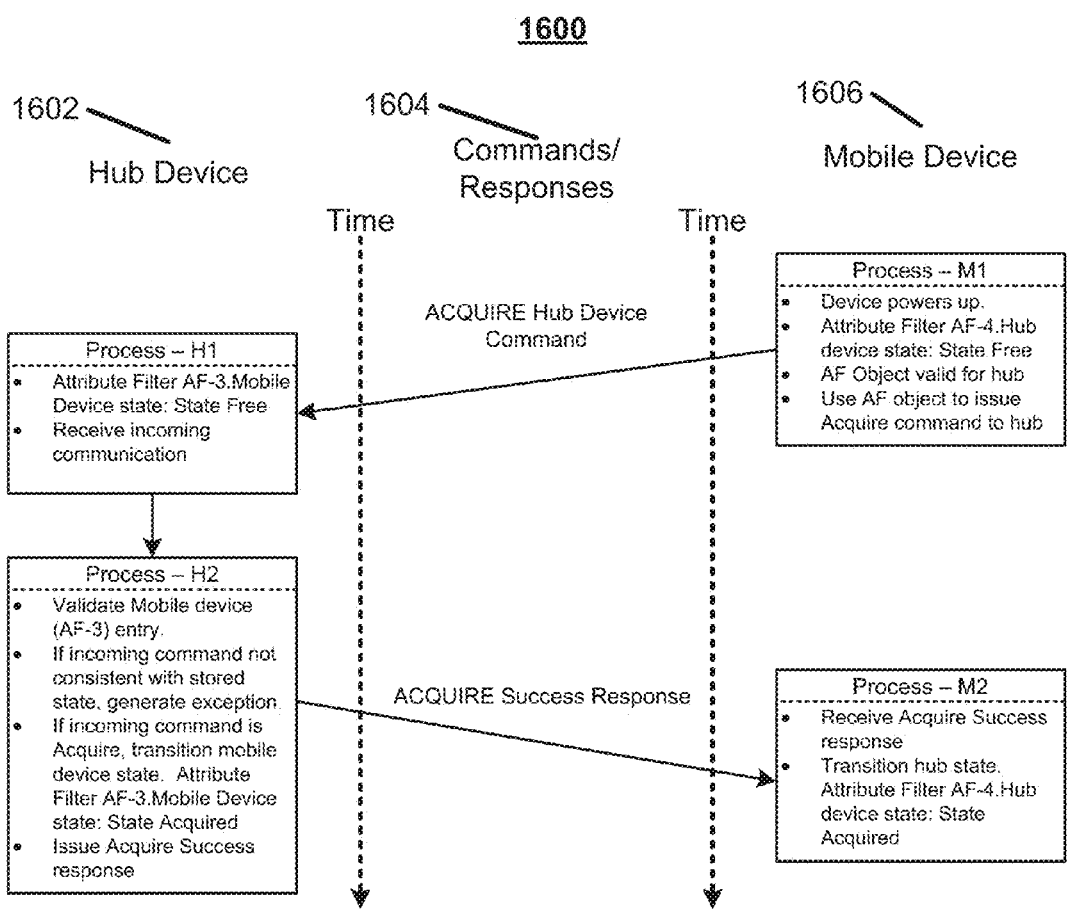
FIG. 16 is a state flowchart of a device being acquired in a multi-device environment.

Flow 1600 in FIG. 16 illustrates how a device is brought in the user's domain and how the state of the device in the Attribute Filter of the hub device 100 and the mobile device 1400 changes to allow the respective device to communicate with each other. There are three columns shown with label Hub Device 1602, Commands/Responses 1604, and the Mobile Device 1606. In the embodiment, Mobile Device is used as an example. Any other device can be brought into the user domain in the same way. When the mobile device is not in the user domain, its state in the Attribute Filter 234, in AF-3 for example, in the hub device is State Free, as shown in process H1. A State Free prevents the hub device from sending or receiving any functional commands, such as send or receive data, exchange AR objects, etc., to the mobile device. Only state query or state transition commands can be exchanged. Unless a device state is "State Acquired" for both devices as described below, functional communication cannot take place between the devices.

Consider as an example that a mobile device 1400 powers up and is ready to communicate with the hub device 100. In this instance, process M1 shows the state of the hub device in the mobile device Attribute Filter 1534, here object AF-4, as State Free (default). By default, all other devices Attribute Filter objects are in State Free when a device, such as the mobile device, first power up and is ready to enter communication with those devices. Process M1 in FIG. 16 shows this state and the steps that are followed by the mobile device to acquire the hub device. First, it checks that the hub device state is State Free. In order to check the hub device state, the mobile device 1400 first checks its Attribute Filter 1534, object AF-4, to validate that it is permitted to communicate with the hub device 100. Validation includes checking HomeDomain, hub device ID and the device state. If the entry is valid, the mobile device 1400 uses the appropriate network protocols to connect itself to the user subscribed wireless network that also provides it with access to the Internet. Using the wireless network, the Application 1512 in the mobile device 1400 issues an "Acquire (HomeDomain.devicetype.ID)" command to the hub device 100.

The "Acquire (HomeDomain.devicetype.ID)" command from the mobile device 1400 is received by the hub device 100 in process H1. After completing the receive command, the hub device 100 goes to process H2. The hub device first checks if the sending device is permitted to communicate with it by validating its AF object, AF-3 as an example, in the Attribute Filter 234. Validation requires checking the HomeDomain name and the devicetype, such as a mobile device 1400 of type iPhone 5. If the check succeeds, the hub device then checks if the incoming command is consistent with the stored state of the mobile device, which is State Free (from process H1). As an example, if the mobile device AF-3 entry in the hub device 100 indicates that the mobile device is in a "State Acquired" state and another Acquire command is received, then the hub device might consider the mobile device as not operating correctly and generates an exception. Exception may cause the hub-device to initiate a programmatic recovery of the mobile device. If the state of the mobile device and the incoming command is consistent, the hub device 100 authenticates the mobile device's particulars in AF-3 and transitions the device state from State Free to State Acquired. A response is then issued to the mobile device of Acquire Success. Upon receiving an Acquire Success response in process M2, the mobile device 1400 transitions its hub device Attribute Filter object AF-4 in 1534 to State Acquired.

Similar to the Acquire command, a "Free (HomeDomain.devicetype.ID)" command is also provided that when issued by the mobile device causes it to transition the AF-4, as in the above example, for the hub device in 1534, to a State Free. Upon receiving a "Free (HomeDomain.devicetype.ID)" command, the hub device 100 transitions the mobile device Attribute Filter, AF-3 in the above example, in Attribute Filters 234, to a State Free. A response of Free Success is issued by the hub device 100 which the mobile device may or may not receive, e.g. when powered off or the network is experiencing long delays. If the mobile device is powered off, then upon powering up the hub state in its Attribute Filter in 1534 would default to State Free, as described above in process M1, FIG. 16. Receiving a Free Success response will not change anything in the mobile device as it is in the correct state. If the mobile device is not powered off, and it does not receive the Free Success response, it will continue to show hub device in the State Acquired in AF-4, in Attribute Filter 1534. It may issue commands to the hub device which will receive a response of state error. At this time, the mobile device can be powered off and powered on, or the hub device will initiate state check and recovery for the mobile device.

In order to avoid issues with state conflicts, i.e., where the states stored in the hub and the mobile device do not agree, the Acquire and Free commands are executed by devices in their entirety before the next Acquire or Free command is processed.

The State Acquired state of the Attribute Filter for a target device enables the device to carry out synchronization when needed. If the state is State Free, no operational communication, such as data transfers and non-state changing commands, can be initiated by the Applications 212 and 1512 and, hence, no synchronization or other communication supported by the Application can take place.

As previously stated, Attribute Filters 234 also provide information on the protocol that a device supports. If the mobile device established a connection with the hub device using the IP address or the USB, the hub device would know how to communicate with the mobile device (using an IP address based protocol or the USB).

Similar to the "UI category tag" state defined earlier in the AR objects in AR structures 220 of FIG. 2, another state is defined in the AR object called State Original and State Copy. The new states establish the "ownership" of a particular AR object in an environment where the AR object can exist in more than one device. AR object exists in more than one device when the user characteristic or the information on content, product, advertisement or services (properties) represented by the AR object is used by both devices. In such an environment, as would be the case if the user has more than one device in the user domain, the need arises to manage such AR objects between a hub device 100 (such as STB or a gateway) and a mobile device 1400. The AR object contains two types of information. The first type of information is the property information, such as keywords, URLs, etc. that defines what this AR object represents. The second type of information is meaningful only in the context of the device. Such information includes visit count, forward and backward links, etc. The properties information when synchronized is beneficial in that it reduces analysis and AR object creation computation in the mobile device and makes the mobile device provide the most up to date interest-centric information about the user to the hub 100. Rules are defined that uses the two states, State Original and State Copy, in the AR objects to manage synchronization so that both devices can have the latest AR object properties. The device's context-sensitive information, such as visit count or links, is generally not shared between the devices as such information is meaningful only to the device in which the AR object is stored.

An AR object in AR structure 220 in the hub device or AR structure 1520 in the mobile device with a State Original indicates that it is most up to date and, if in need of updating, would be the one to be updated. An AR object with a State Copy indicates that this is a copy of the AR object with a State Original that resides in another device. An AR object with State Copy can be read as many times as needed but cannot be updated. By definition, all objects in the hub device when created have State Original and all objects installed in the mobile or satellite devices when first installed have State Copy.

Figure 17:
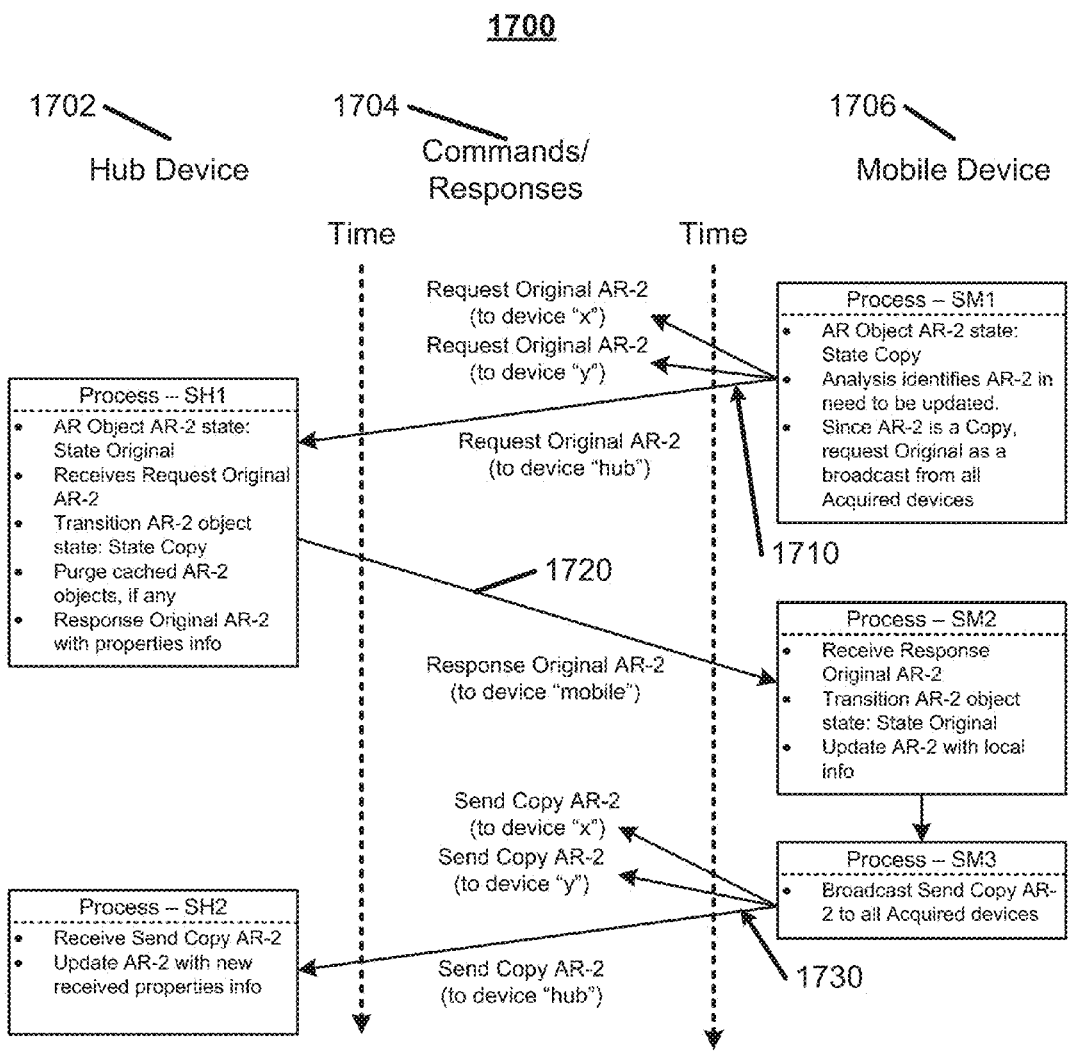
FIG. 17 is a state flowchart of synchronizing a device in a multi-device environment.

The rules for managing the State Original and State Copy in the AR objects can be illustrated in one embodiment as a flow 1700 in FIG. 17. As in FIG. 16, there are three columns shown with label Hub Device 1702, Commands/Responses 1704, and the Mobile Device 1706. Process SH1 in flow 1700 shows that the hub device 100 has the Attribute Repository object exemplary AR-2 in AR 222, in FIG. 2, with State Original. The hub device is the owner of object AR-2. The mobile device 1400 also has an object AR-2 stored in AR 1522 (FIG. 15) with the state of State Copy. The mobile device can use the object AR-2 stored in AR 1522 for comparison, analysis, and to form chains. The mobile device 1400 cannot modify the object AR-2, in 1522, with properties information, such as URL. Device context sensitive information can be modified as described above.

In flow 1700 in FIG. 17 and in process SM1, the mobile device has the copy of AR-2 object as shown. During content analysis, the mobile device determines that the properties information in Attribute Repository object AR-2 in 1522 needs to be updated, e.g. adding a new URL. To do so, the mobile device 1400 broadcasts a Request Original AR-2 command 1710 to all devices that are in the State Acquired in the Attribute Filter 1534 in FIG. 15. In this embodiment, the broadcast 1710 comprises multiple single commands sent to each device that is in the State Acquired in the Attribute Filter 1534, in the mobile device 1400. FIG. 17, process SM1, shows three commands 1710 going to three different devices, x, y, and hub, that are in the State Acquired in the Attribute Filter 1534. More or fewer commands 1710 might be sent depending on the number of other devices the mobile device 1400 is aware of having the State Acquired. Further, the broadcast 1710 can be a single command depending upon implementation of the communication protocol between devices.

Of the commands 1710 sent by the mobile device, the hub device 100 receives one of these commands. In process SH1, the AR-2 object in the hub device in 222, is in the State Original. The hub device transitions the AR object AR2 from the State Original to State Copy. If this AR is cached in any other place in the hub device, such as cache memory (not shown), it is purged. The hub device 100 then explicitly responds to the mobile device 1400 with a reply 1720 of Response Original AR-2.

In process SM2, the mobile device 1400 receives the Response Original AR-2, shown as 1720 in FIG. 17. The mobile device then transitions the object AR-2 state stored in AR 1522 from a State Copy to a State Original. The mobile device 1400 would be updating the properties information in the object AR-2 in AR 1522. After the AR-2 object state has changed to State Original, the properties information in AR-2 is then updated. All the context sensitive information of the device 1400 stored in object AR-2 in AR 1522, such as visit count, links, etc. are preserved. The mobile device 1400 goes to state SM3 where it issues a broadcast command 1730 of Send Copy AR2 to all devices that are in the State Acquired in the Attribute Filter 1534 in FIG. 15. In this embodiment, the broadcast 1730 is one command at a time to the devices that are in the State Acquired but can be a single command depending upon implementation of the communication protocol between devices.

In process SH2, the hub device 100 receives the Send Copy AR-2 command 1730. Since this command is a send of updated properties information in the AR-2 object, the hub device updates the stored object AR-2 in AR 222 with the newly received properties information. The device context sensitive information is retained as described above.

The FIG. 17 illustrates rules that can be stated as follows:

(1) When creating a new AR object, its state is State Original. The creating device must broadcast the State Copy of this AR object so that other devices can update the properties information of the AR object. To keep track of the AR objects, AR objects in common but on different devices have a common reference. As embodied here, an AR object has a reference that can be constructed in many ways and is not limited to a physical memory address but might be a logical address as desired.

(2) When a device does not have an AR object and wants to check if any other device has the same AR object, it can broadcast a request for a copy of the AR object. When received, the state of the stored AR object in the requesting device will be State Copy.

(3) If a device wants to update an AR object that has a state of State Copy, it must request the AR object with State Original that might reside in any of the devices in the user's domain. After update, the device owning the AR object broadcasts a copy of the updated AR object so if any other device has the same AR object, it can be updated with new information. The updated AR object in such devices will have a state of State Copy.

(4) If a device has an AR object with State Copy and it wants to use it without an update of properties information, the AR object will continue to have a state of State Copy.

(5) Lastly, if two devices created new AR objects with states of State Originals, then when they receive copies of the AR object per rule one, conflict is resolved in favor of the newest AR object or, when the objects are created at exactly the same time, the object created on the hub device wins.

If the mobile device is operating such that the items in the Attribute Repositories have not changed (meaning they are Copies), then no synchronization will be needed. This means that no new items are learned. Existing AR objects are used to provide user interest centric content and information.

If the mobile device creates a new AR object, its state is State Original. The new AR object can be sent to the hub device with a Send Copy command when the mobile device is in the vicinity of the hub device and on a high-speed network and synchronization is taking place. The hub device will receive the AR object with a state of State Copy.

During the course of normal operation on a mobile device, a user may encounter an AR object that has links pointing to content. If the content is not present on the mobile device, a "Request Content Copy" command (not shown) will be issued to all devices. Devices that have a copy of the content will respond with a suitable result. The mobile device can then issue a "Transfer Content" command to a device that will result in the target device establishing a data transfer connection with the requesting device and transferring the content thereto.

Similar to the Request Content Copy command described above that transfers content from one user device to another, a command is provided that will "pass through" content from a subscription a user may have through the hub device but is restricted from other devices for whatever reason. Following a successful connection with the hub device and a sign-in by the mobile device into one of the subscriptions that the user may have on the hub device (STB), the subscribed content can be transferred from the provider, through the hub device, and transferred to the mobile device. For example, if the user is in a foreign country and issues a command "Request Subscription ID Connect" to the hub, the hub device uses the ID to tune to a TV channel or logs-in to a web-based content provider, if so requested. After a successful connection in the hub device (STB) to a TV channel or a log-in to the web-based content provider (subscription), the hub will issue a "Transfer Content" command to the mobile device. Once acknowledgement is received, the content received by the hub device may then be "passed through" to the mobile device. If the hub was receiving a streamed content from the source (TV or web), it will be "streamed" to the mobile device over, for example, a secure device-to-device link.

As described above, the exemplary embodiment is for TV viewing at home where the user benefits from the system 100. The system 100 can similarly be used to support commercial businesses by changing the usage classification to target a business such as a dentist, doctor, lawyer, auto dealership, warehouse, etc. where the user needs to know information pertaining to their products, services, subscriptions, customer feedback, etc. A UI can be defined that supports a particular business. The Seed 224 in the Attribute Repository Structures 220 can be provided that contains the terms aligned with this business. All other processes and structures described previously will stay the same. Since the invention is adaptive in nature, if deployed, it will learn from the business and will begin to make targeted recommendations.

While the exemplary embodiments of the present invention have been described with respect to processing blocks in a software program, including possible implementation as a digital signal processor, micro-controller, or general-purpose computer, the present invention is not so limited. As would be apparent to one skilled in the art, various functions of software might also be implemented as processes of circuits. Such circuits might be employed in, for example, a single integrated circuit, a multi-chip module, a single card, or multi-card circuits pack.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Although the subject matter described herein may have been described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, or apparatus.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It will be further understood that various changes in the details, materials, and arrangements of the parts which have been described and illustrated in order to explain the nature of this invention might be made by those skilled in the art without departing from the scope of the invention as expressed in the following claims.

The invention claimed is:

1. An apparatus comprising:
an interface configured for external communication with at least one peer device;
a memory configured to store least one data object therein, the data object being either an original or a copy; and
a processor coupled to the memory and the interface,
wherein the processor, in a first state, is configured to:
establish communication with the peer device via the interface; and
enter a second state once communication has been established with the peer device,
wherein the processor, in the second state, is configured to:
determine if the memory contains a data object copy;
transmit to the peer device, via the interface, a request for the peer device to send an original data object that corresponds to a data object stored in the memory if the data object stored in the memory is determined to be a copy and data in the stored data object is to be modified by the processor;
receive, via the interface, the requested data object or a negative response;
if the requested data object is received from the peer device, store the requested data object in the memory as an original data object;
if the requested data object is not received from the peer device, mark the data object stored in the memory as an original data object; and
modify data in the original data object stored in the memory.

2. A method performed by an apparatus having a memory, a first state, and a second state, the method comprising:
when the apparatus is in a first state:
establishing communication with a peer device; and
entering the second state once communication has been established with the peer device,
when the apparatus is in the second state:
determining if the memory contains a data object copy;
transmitting to the peer device a request for the peer device to send an original data object that corresponds to a data object stored in the memory if the data object stored in the memory is determined to be a copy and data in the stored data object is to be modified by the apparatus;
receiving the requested data object or a negative response;
if the requested data object is received from the peer device, storing the requested data object stored in the memory as an original data object;
if the requested data object is not received from the peer device, marking the data object stored in the memory as an original data object;
modifying data in the original data object stored in the memory.

3. An apparatus comprising:
an interface configured for external communication with a plurality of peer devices;
a memory configured to store least one data object therein, the data object being either an original or a copy; and
a processor coupled to the memory and the interface,
wherein the processor, in a first state, is configured to:
determine if the memory contains a data object copy;
establish communication with at least one of the peer devices via the interface; and
enter a second state once communication has been established with the at least one peer device,
wherein the processor, in the second state, is configured to:
transmit, to all the peer devices in communication with the processor, a request for the peer devices to send an original data object that corresponds to a data object stored in the memory if the data object stored in the memory is determined to be a copy and data in the stored data object is to be modified by the processor;
receive, from peer devices responding to the transmitted request, the requested data object or a negative response;
if the requested data object is received from the peer device, store the requested data object in the memory as an original data object;
if the requested data object is not received from the peer device, mark the data object stored in the memory as an original data object; and
modify data in the original data object stored in the memory.

4. A method performed by an apparatus having a memory, a first state, and a second state, the method comprising:
when the apparatus is in a first state:
establishing communication with at least one of a plurality of peer devices; and
entering the second state once communication has been established with the at least one peer device,
when the apparatus is in the second state:
determining if the memory contains a data object copy;
transmitting, to all of the peer devices in communication with the apparatus, a request for the peer devices to send an original data object that corresponds to a data object stored in the memory if the data object stored in the memory is determined to be a copy and data in the stored data object is to be modified by the apparatus;
receiving, from peer devices responding to the transmitted request, the requested data object or a negative response;

if the requested data object is received from the peer device, storing the requested data object stored in the memory as an original data object;
   if the requested data object is not received from the peer device, marking the data object stored in the memory as an original data object;
   modifying data in the original data object stored in the memory.

5. The apparatus of claim 1 wherein the processor is initially in the first state and, if communication with a peer device fails, the processor returns to the first state.

6. The apparatus of claim 1 wherein the processor, when in the first state, is further configured to:
   modify data in a data object stored in the memory only if the stored data object is an original; and
   create, in the memory, an original data object.

7. The apparatus of claim 1 wherein the processor is configured to remain in the first state until an authentication of the peer device using the interface is completed by the processor, after which the processor enters the second state.

8. The apparatus of claim 1 wherein the processor, when in the second state, is further configured to modify the data in a data object stored in the memory only if the data object is an original data object.

9. The apparatus of claim 1 wherein the transmitted request includes an identifier for the data object being requested.

10. The apparatus of claim 1 wherein, when the processor is in the second state, the processor is further configured to:
    receive, via the interface, a request from the peer device for a data object stored in the memory; and
    transmit, via the interface, the requested data object to the peer device if the requested data object is an original data object, otherwise transmit a negative response to the peer device.

11. The apparatus of claim 1 wherein, when the processor enters into the second state, the processor is configured to transmit to the peer device, via the interface, original data objects stored in the memory.

12. The apparatus of claim 1 wherein the processor, while in the second state, is further configured to transmit to the peer device, via the interface, the modified original data objects stored in the memory.

13. The apparatus of claim 1 wherein the data object represents personal preferences of a user of the apparatus.

14. The apparatus of claim 1 wherein the apparatus is a set top box and at least one of the peer devices is selected from the group of PCs, laptops, smart phones, and tablets.

15. The apparatus of claim 1 wherein the apparatus is selected from the group of set top boxes, PCs, laptops, smart phones, and tablets.

16. The method of claim 2 wherein the apparatus is initially in the first state and the method further comprises:
    returning the apparatus to the first state if communication with a peer device fails.

17. The method of claim 2 wherein when the apparatus is in the second state, the method further comprises:
    modifying data in a data object stored in the memory only if the stored data object is an original; and
    creating, in the memory, an original data object.

18. The method of claim 2 wherein the apparatus remains in the first state until an authentication of the peer device is completed by the apparatus, after which the apparatus enters the second state.

19. The method of claim 2 wherein when the apparatus is in the second state, the method further comprises:
    modifying the data in a data object stored in the memory only if the data object is an original data object.

20. The method of claim 2 wherein the transmitted request includes an identifier for the data object being requested.

21. The method of claim 2 wherein, when the apparatus is in the second state, the method further comprises:
    receiving a request from the peer device for a data object stored in the memory;
    transmitting the requested data object to the peer device if the requested data object is an original data object; and
    transmitting a negative response to the peer device if the requested data object is a data object copy.

22. The method of claim 21 wherein the request from the peer device includes an identifier unique to the requested data object, and the method further comprises:
    matching the received identifier to that of a data object stored in the memory; and
    marking the matched data object stored in the memory as a copy.

23. The method of claim 2 wherein, when the apparatus enters into the second state, the apparatus is configured to transmit to the peer device original data objects stored in the memory.

24. The method of claim 2 wherein the apparatus transmits to the peer device the modified original data objects stored in the memory.

25. The method of claim 2 wherein the data object represents personal preferences of a user of the apparatus.

26. The method of claim 2 wherein the apparatus is a set top box and at least one of the peer devices is selected from the group of PCs, laptops, smart phones, and tablets.

27. The method of claim 2 wherein the apparatus is selected from the group of set top boxes, PCs, laptops, smart phones, and tablets.

28. The apparatus of claim 7 wherein the processor stores a state associated with the peer device, the initial stored state of the peer device is a first state and, after authentication of the peer device, the processor updates the stored state of the peer device from the first state to a second state.

29. The apparatus of claim 7 wherein the processor is further configured to:
    store a list of peer devices with which the processor is allowed to communicate, the list including the state of each of the peer devices and information for the processor to authenticate each peer device on the list;
    wherein the state of the processor is determined with respect to each of the peer devices.

30. The apparatus of claim 9 wherein the identifier is unique to the data object independent of whether the data object is an original or a copy.

31. The apparatus of claim 10 wherein the request from the peer device includes an identifier unique to the requested data object and the processor is further configured to:
    match the received identifier to that of a data object stored in the memory; and
    mark the matched data object stored in the memory as a copy.

32. The apparatus of claim 11 wherein if the data object stored in the memory and the corresponding data object stored in the peer device are both originals, then the processor is configured to:
    receive the corresponding data object from the peer device; and
    replace the original data object stored in the memory with the received data object.

33. The apparatus of claim 11 wherein if the data object stored in the memory and the corresponding data object stored in the peer device are both originals, then the processor is configured to:

receive the corresponding data object from the peer device; and replace the original data object stored in the memory with the received data object if the received data object is newer than the original data object stored in the memory.

34. The method of claim 18 wherein the apparatus stores a state associated with the peer device, the stored state of the peer device is initially the first state and, after authentication of the peer device, the method further comprises:

changing the stored state of the peer device from a first state to a second state.

35. The method of claim 18 further comprising:

storing a list of peer devices with which the apparatus is allowed to communicate, the list including the state of each of the peer devices and information for the apparatus to authenticate each peer device on the list;

wherein the state of the apparatus is determined with respect to each of the peer devices.

36. The method of claim 20 wherein the identifier is unique to the data object independent of whether the data object is an original or a copy.

37. The method of claim 23 wherein if the data object stored in the memory and the corresponding data object stored in the peer device are both originals, then the method further comprises:

receiving the corresponding data object from the peer device; and replacing the original data object stored in the memory with the received data object.

38. The method of claim 23 wherein if the data object stored in the memory and the corresponding data object stored in the peer device are both originals, then the method further comprises:

receiving the corresponding data object from the peer device; and replacing the original data object stored in the memory with the received data object if the received data object is newer than the original data object stored in the memory.

39. The apparatus of claim 28 wherein the processor, in the first state and prior to the processor updating the stored state of the peer device from a first state to a second state, is configured to:

receive, via the interface, a request from the peer device to change the stored state of the peer device from the first state to the second state;

and wherein after the processor updates the stored state of the peer device from a first state to a second state, is configured to:

transmit, via the interface, a response to the peer device indicating that the stored state of peer device is the second state.

40. The apparatus of claim 29 wherein the processor remains in the second state as long as the processor is in communication with at least one of the peer devices.

41. The method of claim 34 wherein, prior to the step of changing the stored state of the peer device from a first state to a second state, the method further comprises:

receiving a request from the peer device to change the stored state of the peer device from the first state to the second state;

and wherein, after the step of changing the stored state of the peer device from a first state to a second state, the method further comprises:

transmitting a response to the peer device indicating that the stored state of peer device is the second state.

42. The method of claim 35 wherein the apparatus remains in the second state as long as the apparatus is in communication with at least one of the peer devices.

* * * * *